US012811727B2

(12) United States Patent
Yang et al.

(10) Patent No.: US 12,811,727 B2
(45) Date of Patent: Nov. 24, 2026

(54) ORDERING BETWEEN PHYSICAL UPLINK CONTROL CHANNEL (PUCCH) DEFERRAL AND OTHER PHYSICAL-LAYER PROCEDURES

(71) Applicant: QUALCOMM Incorporated, San Diego, CA (US)

(72) Inventors: Wei Yang, San Diego, CA (US); Peter Gaal, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 805 days.

(21) Appl. No.: 17/658,999

(22) Filed: Apr. 12, 2022

(65) Prior Publication Data

US 2022/0329362 A1 Oct. 13, 2022

Related U.S. Application Data

(60) Provisional application No. 63/174,501, filed on Apr. 13, 2021.

(51) Int. Cl.
*H04L 1/1829* (2023.01)
*H04L 1/1812* (2023.01)
*H04W 72/21* (2023.01)

(52) U.S. Cl.
CPC .......... *H04L 1/1854* (2013.01); *H04L 1/1812* (2013.01); *H04W 72/21* (2023.01)

(58) Field of Classification Search
USPC .......................................................... 370/329
See application file for complete search history.

(56) References Cited

U.S. PATENT DOCUMENTS 10,791,546 B2 9/2020 Chen et al.
2017/0041103 A1* 2/2017 Määttanen .......... H04L 27/2278
(Continued)

FOREIGN PATENT DOCUMENTS

CA 3098280 A1 5/2021
CN 111294151 A 6/2020
(Continued)

OTHER PUBLICATIONS

Intel Corporation: "Enhancements on PUSCH Repetition Type A", 3GPP TSG RAN WG1 #104-e, 3GPP Draft, R1-2100665, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), 4 Pages, XP051971135, Retrieved from the Internet: URL: https://ftp.3gpp.org/tsg_ran/WG1_RL1/TSGR1_104-e/Docs/R1-2100665.zip, R1-2100665 Intel CovEnh_PUSCH_Rep_TypeA.docx, [retrieved on Jan. 19, 2021], Section 2.2 figure 2.

(Continued)

*Primary Examiner* — Gregory B Sefcheck
*Assistant Examiner* — Majid Esmaeilian
(74) *Attorney, Agent, or Firm* — Norton Rose Fulbright US LLP

(57) ABSTRACT

This disclosure provides systems, methods, and devices for wireless communication that provide a mechanism for managing a sequential order for performing a deferral procedure and at least one other slot index-dependent procedure in a wireless communication system. In particular aspects, a user equipment, UE, may be configured to perform a first slot index-dependent procedure and a deferral procedure of uplink repetitions. The UE may determine a sequential order for performing the deferral procedure and the first slot index-dependent procedure, and may then perform the
(Continued)

deferral procedure and the first slot index-dependent procedure in the sequential order. The sequential order may include performing the deferral procedure before the first slot index-dependent procedure, performing the deferral procedure after the first slot index-dependent procedure, or a sequential order that is based on a type of procedure of the first slot index-dependent procedure.

64 Claims, 10 Drawing Sheets

(56) References Cited

U.S. PATENT DOCUMENTS

| | | | | |
|---|---|---|---|---|
| 2017/0245265 | A1* | 8/2017 | Hwang | H04W 72/0446 |
| 2018/0019843 | A1* | 1/2018 | Papasakellariou | H04W 72/20 |
| 2019/0058517 | A1* | 2/2019 | Kang | H04L 5/0094 |
| 2019/0320422 | A1* | 10/2019 | Al-Imari | H04W 72/23 |
| 2020/0092068 | A1* | 3/2020 | Yang | H04W 52/06 |
| 2020/0259601 | A1* | 8/2020 | Zhou | H04L 5/0085 |
| 2020/0260486 | A1* | 8/2020 | Zhou | H04W 28/0278 |
| 2020/0275430 | A1* | 8/2020 | Salem | H04L 27/2602 |
| 2020/0275431 | A1 | 8/2020 | Bae et al. | |
| 2020/0367241 | A1* | 11/2020 | Hosseini | H04W 72/0453 |
| 2021/0120559 | A1 | 4/2021 | Li et al. | |
| 2021/0226759 | A1* | 7/2021 | Takeda | H04L 1/1887 |
| 2021/0307070 | A1* | 9/2021 | Kim | H04L 25/0226 |
| 2021/0385036 | A1* | 12/2021 | Bae | H04W 72/0446 |
| 2022/0183038 | A1* | 6/2022 | Saber | H04L 1/1854 |
| 2022/0279538 | A1* | 9/2022 | Jung | H04L 1/1812 |
| 2022/0303054 | A1* | 9/2022 | Zhang | H04W 72/21 |
| 2022/0337356 | A1* | 10/2022 | Dimou | H04L 1/1822 |
| 2022/0354024 | A1* | 11/2022 | Rodriguez | H05K 7/1488 |
| 2023/0156709 | A1* | 5/2023 | Gao | H04L 1/1812<br>370/329 |
| 2023/0164774 | A1* | 5/2023 | Fröberg Olsson | H04L 1/1861<br>370/329 |
| 2023/0261791 | A1 | 8/2023 | Zhou et al. | |
| 2023/0300816 | A1* | 9/2023 | Guo | H04L 1/1822<br>370/329 |
| 2024/0064768 | A1* | 2/2024 | Matsumura | H04L 1/1861 |

FOREIGN PATENT DOCUMENTS

| | | | |
|---|---|---|---|
| JP | 2020533891 | A | 11/2020 |
| WO | WO-2016073303 | | 5/2016 |
| WO | 2020202303 | A1 | 10/2020 |
| WO | WO-2022093569 | | 5/2022 |

OTHER PUBLICATIONS

Moderator (OPPO): "Summary#1 of Email Thread [104-e-NR-L1enh-URLLC-02]", 3GPP TSG RAN WG1 #1 04-e, 3GPP Draft, R1-2101841, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Feb. 8, 2021 (Feb. 8, 2021), 27 Pages, XP051977630, Retrieved from the Internet: URL: https://ftp.3gpp.org/tsg_ran/WG1_RL1/TSGR1_104-e/Docs/R1-2101841.zip, R1-2101841 summary#1 of [104-e-NR-L1enh-URLLC-02]-final.docx [retrieved on Feb. 8, 2021], Section 2.3.

Partial International Search Report—PCT/US2022/071700—ISA/EPO—Jul. 21, 2022.

3GPP TS 38.213: "3rd Generation Partnership Project, Technical Specification Group Radio Access Network, NR, Physical Layer Procedures for Control (Release 16)", 38213-G50, 3rd Generation Partnership Project (3GPP), Mobile Competence Centre, 650, Route Des Lucioles, F-06921 Sophia-Antipolis Cedex, France, Mar. 30, 2021, XP051991252, section 9.2.6, pp. 1-183.

International Search Report and Written Opinion—PCT/US2022/071700—ISA/EPO—Sep. 9, 2022.

LG Electronics: "Discussion on UE Feedback Enhancement for HARQ-ACK", 3GPP TSG RAN WG1 #104-e, R1-2100880, 3GPP, Mobile Competence Centre, 650, Route Des Lucioles, F-06921 Sophia-Antipolis Cedex, France, vol. RAN WG1, No. e-Meeting, Jan. 25, 2021-Feb. 5, 2021, 7 Pages, Jan. 19, 2021, XP051971232, section 2.

Xia, S., et al., "Uplink Control Channel Design for 5G Ultra-Low Latency Communication", 2016 IEEE 27th Annual International Symposium on Personal, Indoor, and Mobile Radio Communications (PIMRC), IEEE, Sep. 4, 2016 (Sep. 4, 2016), XP033035319, pp. 1-6, DOI: 10.1109/PIMRC.2016.7794687 [retrieved on Dec. 21, 2016] Abstract, Sections I and II.

Taiwan Search Report—TW111114043—TIPO—Nov. 18, 2025.

Qualcomm Incorporated: "HARQ-ACK enhancement for IOT and URLLC", 3GPP TSG RAN WG1 #104bis, R1-2103163, e-Meeting, Apr. 12 20, 2021, pp. 1-23.

Wilus Inc: "Discussion on HARQ-ACK enhancement for URLLC/IIoT", 3CPP TSC RAN VC1 #104b-e, R1-2103695, e-Meeting, Apr. 12 20, 2021, 10 Pages.

* cited by examiner

ORDERING BETWEEN PHYSICAL UPLINK CONTROL CHANNEL (PUCCH) DEFERRAL AND OTHER PHYSICAL-LAYER PROCEDURES

CROSS-REFERENCE TO RELATED APPLICATIONS

This application claims the benefit of U.S. Provisional Patent Application No. 63/174,501, entitled, "ORDERING BETWEEN PHYSICAL UPLINK CONTROL CHANNEL (PUCCH) DEFERRAL AND OTHER PHYSICAL-LAYER PROCEDURES," filed on Apr. 13, 2021, which is expressly incorporated by reference herein in its entirety.

TECHNICAL FIELD

Aspects of the present disclosure relate generally to wireless communication systems, and more particularly, to ordering between physical uplink control channel (PUCCH) deferral and other physical-layer procedures.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes determining to perform a deferral procedure on at least one repetition of an uplink transmission to be transmitted to a network entity, in particular a physical uplink control channel (PUCCH) transmission, determining to perform a first slot index-dependent procedure that is based, at least in part, on a resource position associated with the at least one repetition of the uplink transmission to be transmitted to the network entity, determining a sequential order for performing the deferral procedure and the first slot index-dependent procedure, and performing the deferral procedure and the first slot index-dependent procedure in the sequential order.

In an additional aspect of the disclosure, a method for wireless communication includes transmitting a first message configuring a UE to perform at least one repetition of an uplink transmission to be transmitted to the network entity, in particular a PUCCH transmission, and for configuring the UE to perform a deferral procedure on the at least one repetition of the uplink transmission and to perform a first slot index-dependent procedure that is based, at least in part, on a resource position associated with the at least one repetition of the uplink transmission to be transmitted from the UE to the network entity in a sequential order. The method also includes receiving at least one transmission from the UE according to the deferral procedure and the first slot index-dependent procedure in the sequential order.

In an additional aspect of the disclosure, a UE includes at least one processor and a memory coupled to the at least one processor. The at least one processor stores processor-readable code that, when executed by the at least one processor, is configured to perform operations including determining to perform a deferral procedure on at least one repetition of an uplink transmission to be transmitted to a network entity, in particular a PUCCH transmission, determining to perform a first slot index-dependent procedure that is based, at least in part, on a resource position associated with the at least one repetition of the uplink transmission to be transmitted to the network entity, determining a sequential order for performing the deferral procedure and the first slot index-dependent procedure, and performing the deferral procedure and the first slot index-dependent procedure in the sequential order.

In an additional aspect of the disclosure, a network entity includes at least one processor and a memory coupled to the at least one processor. The at least one processor stores processor-readable code that, when executed by the at least one processor, is configured to perform operations including transmitting a first message configuring a UE to perform at least one repetition of an uplink transmission to be transmitted to the network entity, in particular a PUCCH transmission and for configuring the UE to perform a deferral procedure on the at least one repetition of the uplink transmission and to perform a first slot index-dependent procedure that is based, at least in part, on a resource position associated with the at least one repetition of the uplink transmission to be transmitted from the UE to the network entity in a sequential order. The operations also include receiving at least one transmission from the UE according to the deferral procedure and the first slot index-dependent procedure in the sequential order.

In an additional aspect of the disclosure, an apparatus includes means for determining, by a UE, to perform a deferral procedure on at least one repetition of an uplink transmission to be transmitted to a network entity, in particular a PUCCH transmission, means for determining to perform a first slot index-dependent procedure that is based, at least in part, on a resource position associated with the at least one repetition of the uplink transmission to be transmitted to the network entity, means for determining a sequential order for performing the deferral procedure and the first slot index-dependent procedure, and means for performing the deferral procedure and the first slot index-dependent procedure in the sequential order.

In an additional aspect of the disclosure, an apparatus includes means for transmitting, by a network entity, a first message configuring a UE to perform at least one repetition of an uplink transmission to be transmitted to the network entity, in particular a PUCCH transmission, and for configuring the UE to perform a deferral procedure on the at least one repetition of the uplink transmission and to perform a first slot index-dependent procedure that is based, at least in part, on a resource position associated with the at least one repetition of the uplink transmission to be transmitted from the UE to the network entity in a sequential order. The apparatus also includes means for receiving at least one transmission from the UE according to the deferral procedure and the first slot index-dependent procedure in the sequential order.

In an additional aspect of the disclosure, a non-transitory computer-readable medium stores instructions that, when executed by a processor, cause the processor to perform operations. The operations include determining, by a UE, to perform a deferral procedure on at least one repetition of an uplink transmission to be transmitted to a network entity, in particular a PUCCH transmission, determining to perform a first slot index-dependent procedure that is based, at least in part, on a resource position associated with the at least one repetition of the uplink transmission to be transmitted to the network entity, determining a sequential order for performing the deferral procedure and the first slot index-dependent procedure, and performing the deferral procedure and the first slot index-dependent procedure in the sequential order.

In an additional aspect of the disclosure, a non-transitory computer-readable medium stores instructions that, when executed by a processor, cause the processor to perform operations. The operations include transmitting, by a network entity, a first message configuring a UE to perform at least one repetition of an uplink transmission to be transmitted to the network entity, in particular a PUCCH transmission, and for configuring the UE may be configured to perform a deferral procedure on the at least one repetition of the uplink transmission and to perform a first slot index-dependent procedure that is based, at least in part, on a resource position associated with the at least one repetition of the uplink transmission to be transmitted from the UE to the network entity in a sequential order. The operations also include receiving at least one transmission from the UE according to the deferral procedure and the first slot index-dependent procedure in the sequential order.

In an additional aspect of the disclosure, a computer program product includes instructions that, when executed by a processor, causes the processor to perform operations. The operations include determining, by a UE, to perform a deferral procedure on at least one repetition of an uplink transmission to be transmitted to a network entity, in particular a PUCCH transmission, determining to perform a first slot index-dependent procedure that is based, at least in part, on a resource position associated with the at least one repetition of the uplink transmission to be transmitted to the network entity, determining a sequential order for performing the deferral procedure and the first slot index-dependent procedure, and performing the deferral procedure and the first slot index-dependent procedure in the sequential order.

In an additional aspect of the disclosure, a computer program product includes instructions that, when executed by a processor, causes the processor to perform operations. The operations include transmitting, by a network entity, a first message configuring a UE to perform at least one repetition of an uplink transmission to be transmitted to the network entity, in particular a PUCCH transmission, and for configuring the UE may be configured to perform a deferral procedure on the at least one repetition of the uplink transmission and to perform a first slot index-dependent procedure that is based, at least in part, on a resource position associated with the at least one repetition of the uplink transmission to be transmitted from the UE to the network entity in a sequential order. The operations also include receiving at least one transmission from the UE according to the deferral procedure and the first slot index-dependent procedure in the sequential order.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
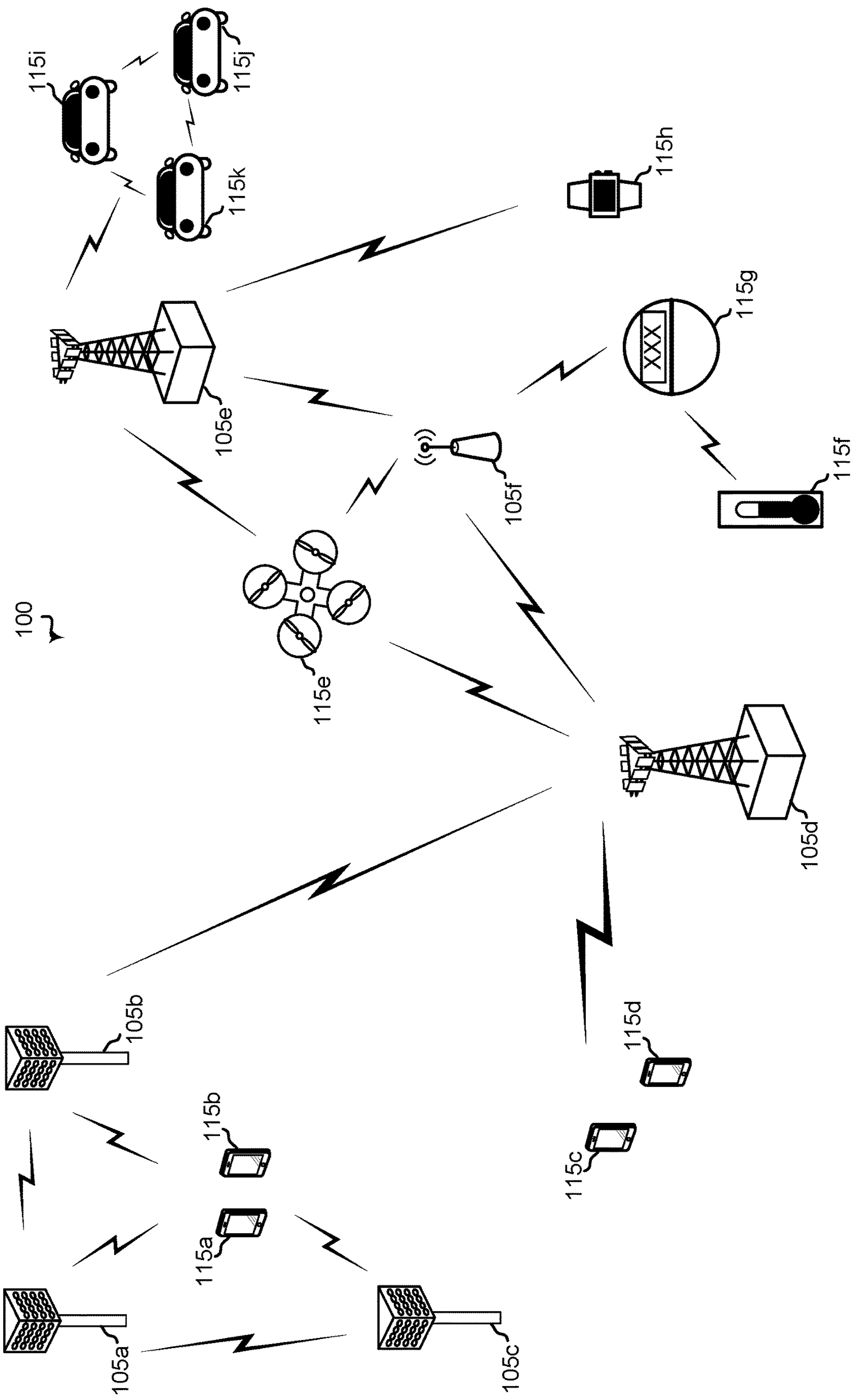
FIG. 1 is a block diagram illustrating details of an example wireless communication system according to one or more aspects.

The detailed description set forth below, in connection with the appended drawings, is intended as a description of various exemplary configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Various aspects, of the present disclosure relate to techniques that provide a mechanism for managing a sequential order for performing a deferral procedure and at least one other slot index-dependent procedure in a wireless communication system. In particular, in aspects of the present disclosure, a user equipment (UE) may be configured or scheduled to transmit a number of physical uplink control channel (PUCCH) repetitions to a base station (e.g., a plurality of PUCCH repetitions). The UE may also determine to perform a first slot index-dependent procedure (e.g., a procedure that may be based, at least in part, on a position (e.g., index) of a resource associated with the first PUCCH repetition of the PUCCH repetitions). For example, a UE may be scheduled to transmit PUCCH repetitions beginning at an original first slot. In this example, the first slot index-dependent procedure may be based on or depends, at least in part, on the slot index in which the first PUCCH repetition is scheduled to be transmitted (e.g., the original first slot). In addition, the UE may determine to perform a deferral procedure on the PUCCH repetitions. In aspects, performing the deferral procedure on the PUCCH repetitions may include deferring the transmission of the first PUCCH repetition to a later slot (e.g., a slot that occurs after the original first slot). In accordance with aspects of the present disclosure, the UE may determine a sequential order for performing the deferral procedure and the first slot index-dependent procedure, and may then perform the deferral procedure and the first slot index-dependent procedure in the sequential order. In aspects, the sequential order for performing the deferral procedure and the first slot index-dependent procedure may include performing the deferral procedure before the first slot index-dependent procedure, performing the deferral procedure after the first slot index-dependent procedure, or determining what type of procedure the first slot index-dependent procedure is and ordering the deferral procedure and the first slot index-dependent procedure based on the procedure type of the first slot index-dependent procedure. In some aspects, the UE may transmit the PUCCH repetitions to the base station based on having performed the deferral procedure and the first slot index-dependent procedure in the sequential order. In this manner, a system implemented in accordance with the present disclosure may address the problems with current wireless communication systems by providing a mechanism for managing the sequential order for performing the deferral procedure and at least one other slot index-dependent procedure, which allows the at least one other slot index-dependent procedure to determine whether to use the original first slot or the deferred first slot.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wide-band-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., –0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A network entity may be a base station, a macro base station, a pico base station, a femto base station, an eNodeB, a relay, a network node, a network equipment, a mobility element or the like. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* may take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

In aspects a network entity, network node, network equipment, mobility element of wireless network 100, etc., may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC, etc.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have to move, and may be kept stationary. Some non-limiting examples of a mobile apparatus, such as those which may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, or a personal digital assistant (PDA). A mobile apparatus may additionally or alternatively be an IoT or "Internet of everything" (IoE) device such as one or more of an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* may serve UEs 115*a* and 115*b* using 3D beamforming and coordinated spatial techniques, such as coordinated multipoint (CoMP) or multi-connectivity. Macro base station 105*d* may perform backhaul communications with base stations 105*a*-105*c*, as well as small cell, base station 105*f*. Macro base station 105*d* may also transmit multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which may relay its information to the network, such as UE 115*f* communicating temperature measurement information to the smart meter, UE 115*g*, which may then be reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
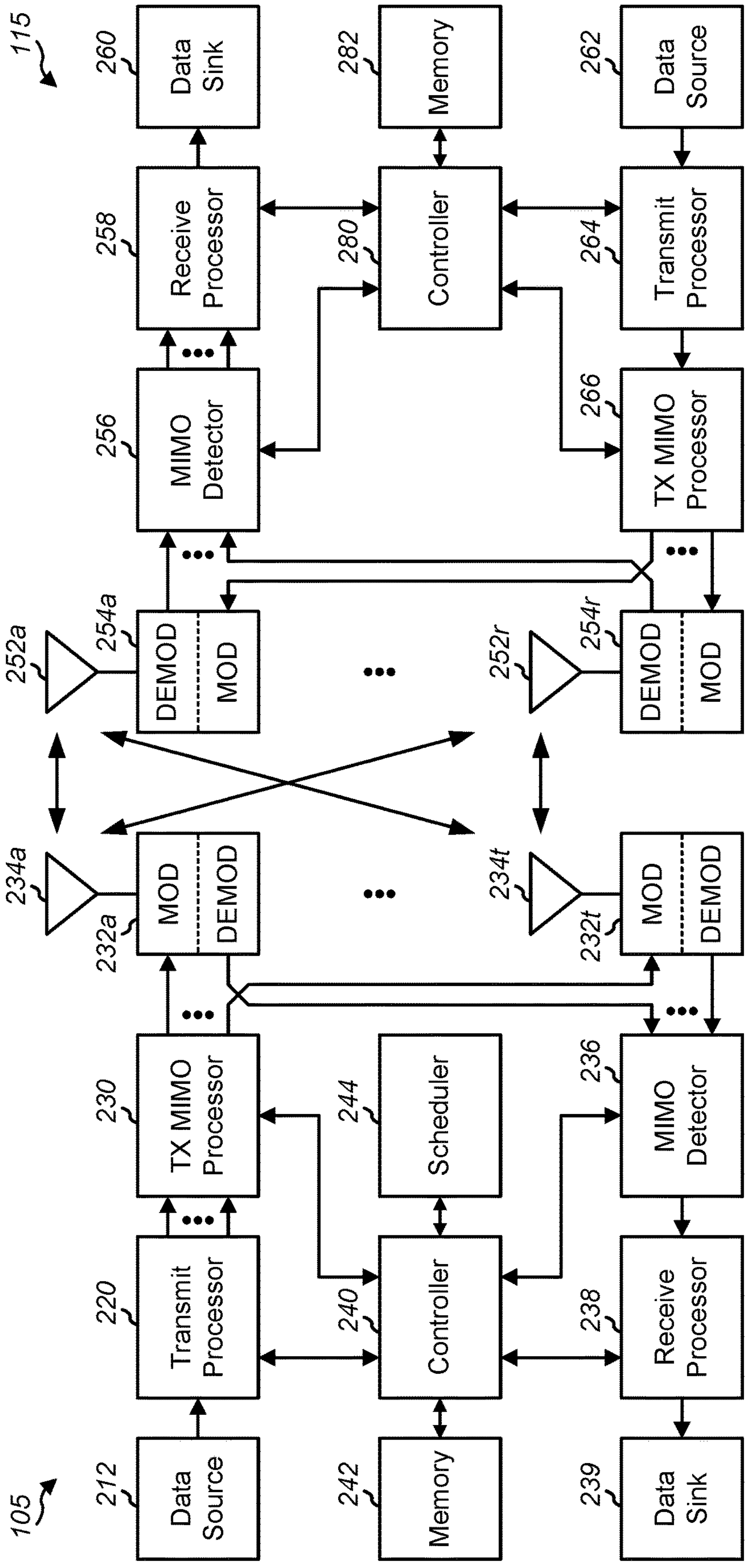
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4, 6, and 7 or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current implementations of wireless communication systems use various mechanisms for increasing reliability of communications. One such mechanism relates to uplink transmissions repetition. For example, in implementations, PUCCH transmissions and/or PUSCH transmissions may be implemented using repetition. When using repetition techniques, a UE may be configured or scheduled to retransmit an uplink transmission repeatedly, or a number of times or repetitions. In these cases, rather than merely transmitting a single uplink transmission, the UE may be configured or scheduled to transmit the uplink transmission a number of times. For example, the uplink transmission may be repeated in a number of resources (e.g., slots). However, in some situations, the first uplink transmission of the repeated transmissions may be scheduled in a resource (e.g., a slot) and at least one of the symbols over which the first uplink transmission may be scheduled to be transmitted is a downlink symbol (e.g., a semi-static downlink symbol). In such a situation, current implementations of wireless communication systems perform a deferral procedure in which all the uplink transmission repetitions are deferred until a later set of resources (e.g., slots) containing sufficient uplink symbols to accommodate the uplink transmission repetitions.

Figure 3:
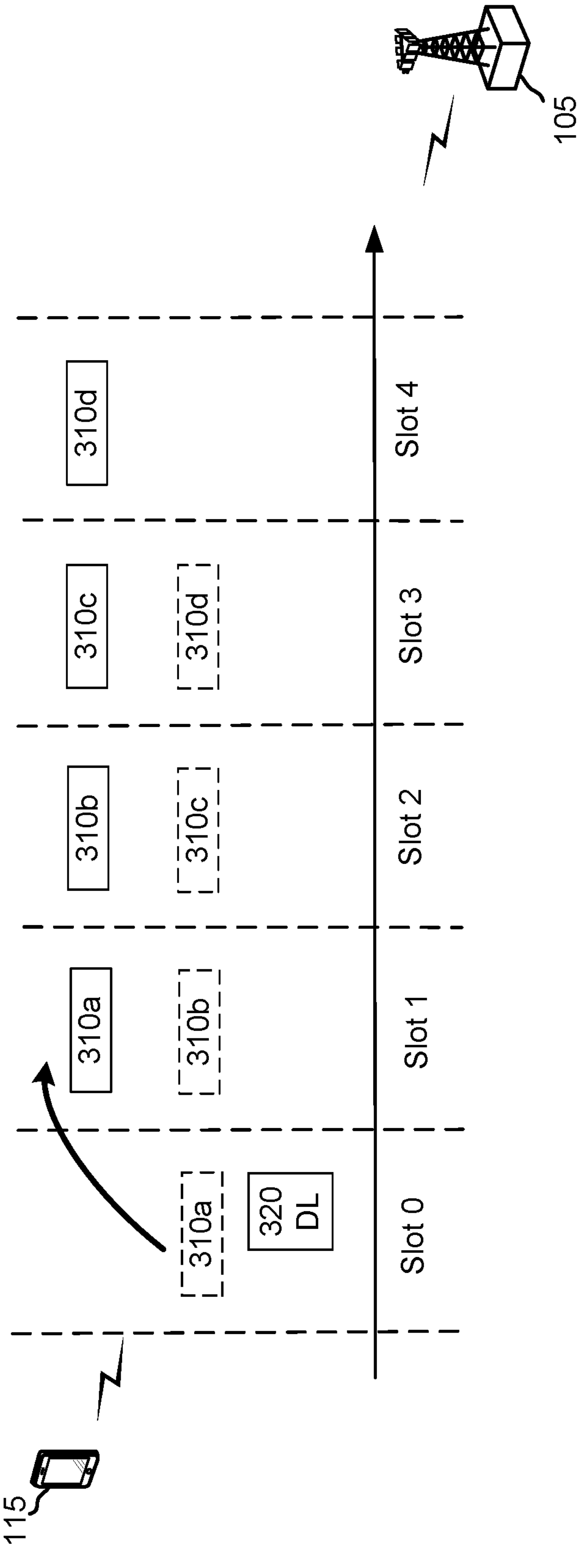
FIG. 3 shows a diagram illustrating an example of a deferral procedure

FIG. 3 shows a diagram illustrating an example of a PUCCH deferral procedure. As shown in FIG. 3, UE 115 may be configured for PUCCH repetition in which a PUCCH transmission is scheduled to be repeated by transmitting PUCCH repetitions 310*a*-310*d* to base station 105. Before the deferral procedure (as illustrated by the dash blocks), UE 115 may be scheduled to transmit the four PUCCH repetitions 310*a*-310*d* beginning at slot 0, and each repetition transmitted in a corresponding slot of slot 0-slot 3. However, as shown, the first PUCCH repetition 310*a* may be scheduled to be transmitted, at least partly, over at least one downlink symbol 320, which may be a semi-static downlink symbol, and as a result, a deferral procedure may be applied. Applying the deferral procedure may include deferring, delaying, scheduling, or otherwise postponing the transmission of at least one of the PUCCH repetitions 310*a*-310*d* until a later set of resources (e.g., slots or symbols) over which the PUCCH repetitions may be transmitted (e.g., a later set of slots that permits the transmission of all the PUCCH repetitions without spanning a semi-static downlink symbol). For example, PUCCH repetitions 310*a*-310*d* may be deferred to begin at slot 1, instead of the original first slot

0, in which case PUCCH repetitions 310*a*-310*d* may be transmitted over slots 1-slot 4, rather than the original slots 0-slot 3.

There are various procedures in current wireless communication systems that depend, often crucially, on a resource position associated with the beginning of the transmission. For example, some procedures depend on the slot index of the slot in which the first repetition of an uplink transmission repetitions is scheduled to be transmitted, or on the slot index of the slot in which the beginning of the uplink transmission is scheduled to be transmitted. These procedures (which herein may be referred to also as "slot index-dependent procedures") may be performed with an assumption of where the beginning of an uplink transmission (e.g., the first slot of the PUCCH repetitions is (e.g., the slot index of the slot in which the first PUCCH repetition is scheduled to be transmitted), and/or the slot in which a PUSCH transmission is scheduled to begin). However, because the beginning of the uplink transmission (e.g., may be postponed to a later slot than originally scheduled) from the original first slot to a deferred first slot, these slot index-dependent procedures may be affected by the uplink transmission deferral procedure, as current wireless communication systems lack a mechanism for determining whether the slot index-dependent procedure is to be performed with respect to the original first slot or with respect to the deferred first slot.

Various aspects, of the present disclosure relate to techniques that provide a mechanism for managing a sequential order for performing a deferral procedure and at least one other slot index-dependent procedure in a wireless communication system. In particular, in aspects of the present disclosure, a UE may be configured or scheduled to transmit a number of repetitions, in particular PUCCH transmissions, to a base station (e.g., a plurality of PUCCH repetitions). The UE may also determine to perform a first slot index-dependent procedure (e.g., a procedure that may be based, at least in part, on a position (e.g., index) of a resource associated with the first PUCCH repetition of the PUCCH repetitions). For example, a UE may be scheduled to transmit PUCCH repetitions beginning at an original first slot. In this example, the first slot index-dependent procedure may be based on or depends, at least in part, on the slot index in which the first PUCCH repetition is scheduled to be transmitted (e.g., the original first slot). In addition, the UE may determine to perform a deferral procedure on the PUCCH repetitions. In aspects, performing the deferral procedure on the PUCCH repetitions may include deferring the transmission of the first PUCCH repetition to a later slot (e.g., a slot that occurs after the original first slot). In accordance with aspects of the present disclosure, the UE may determine a sequential order for performing the deferral procedure and the first slot index-dependent procedure, and may then perform the deferral procedure and the first slot index-dependent procedure in the sequential order. In aspects, the sequential order for performing the deferral procedure and the first slot index-dependent procedure may include performing the deferral procedure before the first slot index-dependent procedure, performing the deferral procedure after the first slot index-dependent procedure, or determining what type of procedure the first slot index-dependent procedure is and ordering the deferral procedure and the first slot index-dependent procedure based on the procedure type of the first slot index-dependent procedure. In some aspects, the UE may transmit the PUCCH repetitions to the base station based on having performed the deferral procedure and the first slot index-dependent procedure in the sequential order. In this manner, a system implemented in accordance with the present disclosure may address the problems with current wireless communication systems by providing a mechanism for managing the sequential order for performing the deferral procedure and at least one other slot index-dependent procedure, which allows the at least one other slot index-dependent procedure to determine whether to use the original first slot or the deferred first slot.

It is noted that the discussion herein focuses on PUCCH transmissions (e.g., the deferral of PUCCH transmission repetitions). However, this is merely for illustrative purposes and not intended to be limiting in any way. Indeed, the techniques herein may be applicable to any uplink transmission that may be deferred. For example, the techniques herein may be applicable for PUSCH transmissions. In some implementations, PUSCH transmissions may be scheduled to be transmitted using repetition and in this case, the PUSCH transmission may be deferred in which transmission of the first PUSCH repetition may be deferred until a later set of resources. In some implementations, PUSCH transmissions may be scheduled to be transmitted without using repetition and in this case, the PUSCH transmission may be deferred until a later set of resources. In these cases, a UE may determine a sequential order for performing the deferral procedure of the PUSCH transmission (e.g., with or without repetition) and the first slot index-dependent procedure, and may then perform the PUSCH transmission deferral procedure and the first slot index-dependent procedure in the determined sequential order, in accordance with aspects of the present disclosure described with respect to PUCCH transmission using repetition. In a particular example, as will be described in more detail herein, the first slot index-dependent procedure may include a HARQ-ACK codebook generation procedure, in which the HARQ-ACK codebook may be configured to be multiplexed on a PUSCH transmission. In this example, the PUSCH transmission may be deferred, in which the slot in which the original PUSCH transmission is scheduled to be transmitted before the PUSCH transmission deferral may be used to determine and/or generate the HARQ-ACK codebook.

Figure 4:
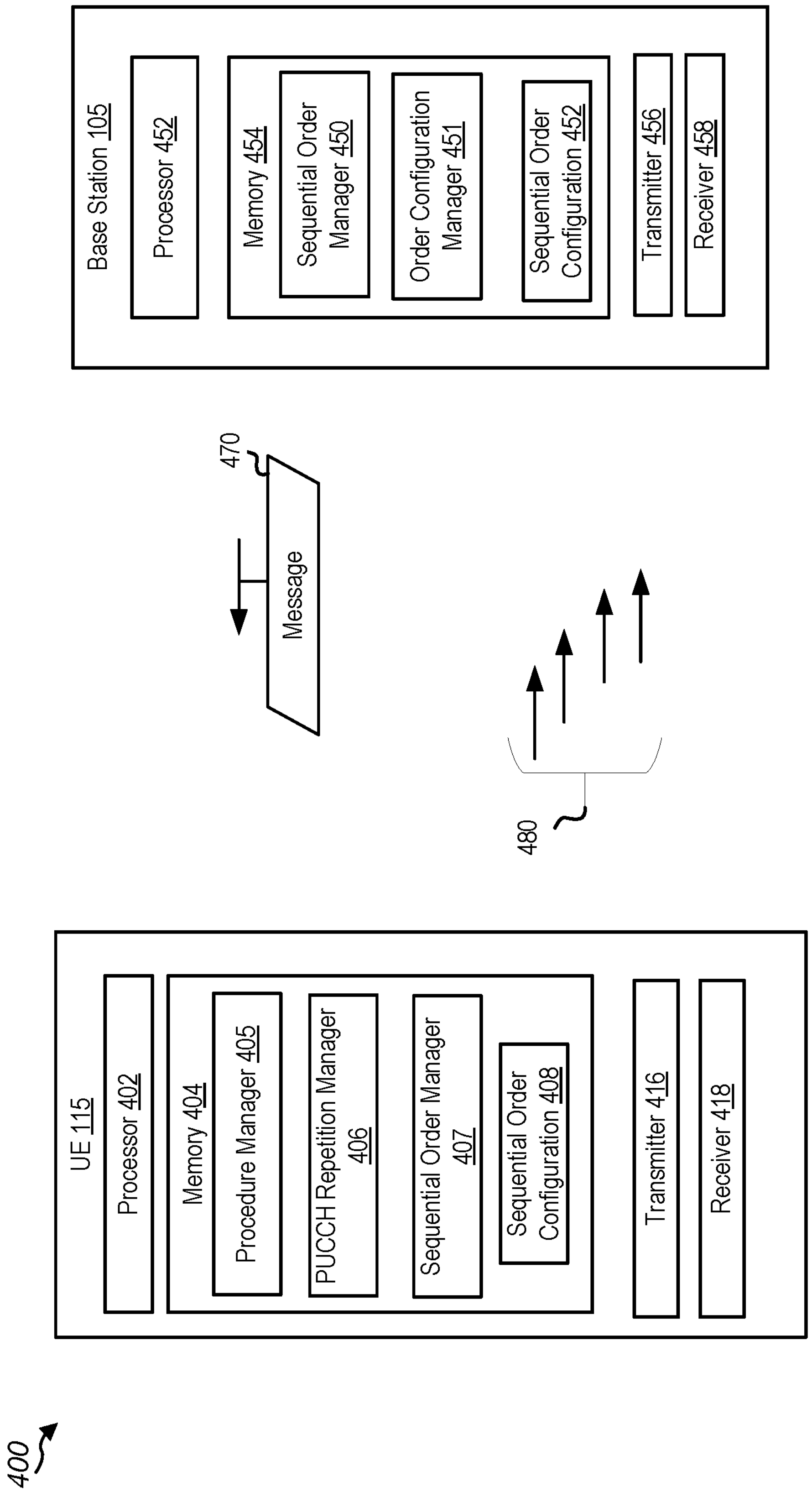
FIG. 4 is a block diagram of an example wireless communications system that provide a mechanism for managing a sequential order for performing a deferral procedure and at least one other slot index-dependent procedure in a wireless communication system according to one or more aspects of the present disclosure.

FIG. 4 is a block diagram of an example wireless communications system 400 that provides a mechanism for managing a sequential order for performing a deferral procedure and at least one slot index-dependent procedure in a wireless communication system according to one or more aspects of the present disclosure. In some examples, wireless communications system 400 may implement aspects of wireless network 100. Wireless communications system 400 includes UE 115 and base station 105. Although one UE 115 and one base station 105 are illustrated, in some other implementations, wireless communications system 400 may generally include multiple UEs 115, and may include more than one base station 105.

UE 115 may include a variety of components (such as structural, hardware components, but also software components or combined software and hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). Processor 402 may be configured to execute instructions stored in memory 404 to perform the operations described herein. In some implementations, processor 402 includes or corresponds to one or more of receive processor 258, transmit processor 264, and controller 280, and memory 404 includes or corresponds to memory 282.

Memory 404 may include or may be configured to store procedure manager 405, PUCCH repetition manager 406, and sequential order manager 407. In aspects, procedure manager 405 may be configured to perform operations to determine to perform a deferral procedure (e.g., a PUCCH repetition deferral procedure) and/or one or more slot index-dependent procedure (e.g., procedures that may be based, at least in part, on a position of a resource associated with the first PUCCH repetition of PUCCH repetitions). In aspects, PUCCH repetition manager 406 may be configured to perform operations to configure or schedule transmission of PUCCH repetitions to a base station (e.g., base station 105). For example, PUCCH repetition manager 406 may operate to repeat a PUCCH message in a plurality of transmissions that are transmitted, or scheduled to be transmitted, in a plurality of slots to base station 105. In these cases, each slot may carry a repetition of the PUCCH repetitions. In aspects, sequential order manager 407 may be configured to perform operations to determine a sequential order in which a deferral procedure and at least one slot index-dependent procedure are to be performed. In aspects, the sequential order may specify performing the deferral procedure before the at least one slot index-dependent procedure, performing the deferral procedure after the at least one slot index-dependent procedure, or determining what type of procedure the first slot index-dependent procedure is and then ordering the procedures (e.g., the deferral procedure and at least one slot index-dependent procedure) based on the procedure type of the first slot index-dependent procedure. Sequential order manager 407 may also be configured to perform the procedures (e.g., the deferral procedure and at least one slot index-dependent procedure) in the sequential order, and/or to cause any of the procedures to be performed in the sequential order.

Transmitter 416 may be configured to transmit reference signals, control information and data to one or more other devices, and receiver 418 may be configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

Base station 105 may include a variety of components (such as structural, hardware components, but also software components or combined software and hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). Processor 452 may be configured to execute instructions stored in memory 454 to perform the operations described herein. In some implementations, processor 452 includes or corresponds to one or more of receive processor 238, transmit processor 220, and controller 240, and memory 454 includes or corresponds to memory 242.

Memory 454 may include or may be configured to store sequential order manager 450 and order configuration manager 451. In aspects, sequential order manager 450 may be configured to perform operations to determine a sequential order in which a UE (e.g., UE 115) is to perform a deferral procedure and at least one slot index-dependent procedure. In aspects, the sequential order may specify performing the deferral procedure before the at least one slot index-dependent procedure, performing the deferral procedure after the at least one slot index-dependent procedure, or determining what type of procedure the first slot index-dependent procedure is and then ordering the procedures (e.g., the deferral procedure and at least one slot index-dependent procedure) based on the procedure type of the first slot index-dependent procedure. Order configuration manager 451 is configured to perform operations to generate sequential order configuration for UE 115 that includes the sequential order determined by sequential order manager 450. In aspects, the sequential order configuration may be transmitted to UE 115, and UE 115 may use the sequential order configuration to determine the sequential order in which to perform the deferral procedure and the at least one slot index-dependent procedure.

Transmitter 456 may be configured to transmit reference signals, synchronization signals, control information and data to one or more other devices, and receiver 458 may be configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, wireless communications system 400 may implement a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP.

During operation of wireless communications system 400, UE 115 may receive message 470 from base station 105. In aspects, message 470 may include an uplink grant configuring or scheduling UE 115 to transmit at least one repetition of the granted PUCCH to base station 105. In these cases, each repetition may be scheduled to be transmitted to base station 105 in a corresponding resource (e.g., a slot, or a subslot). For example, UE 115 may determine to repeat a PUCCH transmission in each of a plurality of slots. As such, a PUCCH repetition may be scheduled to be transmitted in each of the plurality of slots. In aspects, the PUCCH transmission that is to be repeated in each of a plurality of slots may be associated with a particular procedure. For example, a particular procedure may be determined to be performed, which may be associated with the PUCCH repetitions, by scheduling an uplink transmission (e.g., an acknowledgement (ACK) response or a report) on the repeated PUCCH message, or by performing an operation related to the PUCCH message (e.g., prioritizing the PUCCH message with respect to other uplink transmissions).

It is noted that, although the description herein focuses on slot-based PUCCH repetition (e.g., where each PUCCH repetition may be scheduled to be transmitted in each of a plurality of slots), the techniques herein may be also applicable in subslot-based PUCCH repetition, in which each PUCCH repetition may be scheduled to be transmitted in each of a plurality of sub slots. As such, the discussion herein of slot-based PUCCH repetition should not be construed as limiting in any way. For example, in some aspects, UE 115 may determine to repeat a PUCCH transmission in each of a plurality of subslots. As such, a PUCCH repetition may be scheduled to be transmitted in each of the plurality of subslots. In aspects, the PUCCH transmission that is to be repeated in each of a plurality of subslots may be associated with a particular procedure.

During operation of wireless communications system 400, UE 115 may determine to perform at least one first slot index-dependent procedure. In aspects, the at least one first slot index-dependent procedure may be the above mentioned procedure that is associated with the PUCCH repetitions. For example, UE 115 may determine to perform a procedure that depends, at least in part, on a position of the slot in which the first PUCCH repetition is to be transmitted. In aspects, performing the at least one first slot index-dependent procedure may be done using the position (or index) of the first slot (also referred to as the original first slot as this first slot is the slot of the first PUCCH repetition before any deferral procedure). Specific examples of the at least one first slot index-dependent procedure will be discussed in more detail below.

During operation of wireless communications system 400, UE 115 may determine to perform a deferral procedure on the PUCCH repetitions. In aspects, UE 115 may determine to perform a deferral procedure on the PUCCH repetitions based on a determination that the first PUCCH repetition is scheduled to be transmitted, at least partly, in a semi-static downlink symbol. In this case, UE 115 may determine to defer, or postpone, the transmission of the PUCCH repetitions until a later slot. The later slot may be determined by determining a plurality of slots over which the PUCCH repetitions may be transmitted without conflicting with a semi-static DL symbol. In this case, the first PUCCH repetition may be scheduled to be transmitted, or may be transmitted, in the first slot of the plurality of slots over which the PUCCH repetitions may be transmitted without conflicting with a semi-static DL symbol. As such, the deferral procedure of aspects may include scheduling to transmit, and/or transmitting, the PUCCH repetitions over the deferred plurality of slots.

During operation of wireless communications system 400, UE 115 may determine a sequential order in which to perform the deferral procedure and the at least one first slot index-dependent procedure. In aspects, UE 115 may determine the sequential order based on a predetermined configuration of UE 115. For example, predetermined sequential order configuration 408 may be stored in memory 404 of UE 115. UE 115 may retrieve predetermined sequential order configuration 408 and may determine the sequential order based on the configuration therein. In aspects, the predetermined sequential order configuration 408 may be specify configurations and/or rules (e.g., as discussed in more detail below) defining the sequential order based on particular scenarios. In some cases, the sequential order may be specified based on standard configurations (e.g., IEEE standards).

In some aspects, UE 115 may determine the sequential order in which to perform the deferral procedure and the at least one first slot index-dependent procedure based on configuration information received from base station 105. For example, during operation of wireless communications system 400, base station 105 may determine a sequential order in which UE 115 is to perform the deferral procedure and the at least one first slot index-dependent procedure. In aspects, as mentioned above, the sequential order may be predetermined and may be stored as sequential order configuration 452 in memory 454 of base station 105. Base station 105 may retrieve predetermined sequential order configuration 452 and may determine the sequential order for UE 115 based on the configuration therein. In aspects, the predetermined sequential order configuration 452 may be specify configurations and/or rules (e.g., as discussed un more detail below) defining the sequential order based on particular scenarios. In some cases, the sequential order may be specified based on standard configurations (e.g., IEEE standards). In these aspects, base station may transmit to UE 115 a configuration message indicating a sequential order in which UE 115 is to perform the deferral procedure and the at least one first slot index-dependent procedure. For example, the configuration message may be included in message 470, or may transmitted to UE 115 from base station 105 in a different, separate message. UE 115 may receive the configuration from base station 105 including the indication of the sequential order and may determine the sequential order based on the indication.

In aspects, the sequential order for performing the deferral procedure and the at least one first slot index-dependent procedure may include performing the deferral procedure before the at least one first slot index-dependent procedure. In these aspects, UE 115 may be configured to perform the deferral procedure and to postpone the transmission of the first PUCCH repetition (and thereby the transmission of all the PUCCH repetitions) to a deferred first slot. Therefore, instead of transmitting the PUCCH repetitions starting at the original first slot (e.g., the first slot scheduled in a transmission grant granting the PUCCH transmission), UE 115 may transmit, or schedule to transmit, the PUCCH repetitions starting at the deferred first slot. After deferring the PUCCH repetitions transmissions, and determining the deferred first lot, UE 115 may perform the at least one first slot index-dependent procedure based on the index of the deferred first slot. In this case, the at least one first slot index-dependent procedure may be performed using the index of the deferred first slot as the assumed index of the first slot of the PUCCH repetitions, even though the actual first slot of the PUCCH repetitions may be the deferred first slot. As will be appreciated, in this case, the at least one first slot index-dependent procedure is affected by the deferral procedure, as the deferral procedure is performed before the at least one first slot index-dependent procedure is determined to be performed, which results in the at least one first slot index-dependent procedure being performed using the deferred first slot.

In aspects, the sequential order for performing the deferral procedure and the first slot index-dependent procedure may include performing the deferral procedure after the at least one first slot index-dependent procedure. In these aspects, UE 115 may be configured to perform the at least one first slot index-dependent procedure based on the index of the original first slot (e.g., the first slot as scheduled in a transmission grant granting the PUCCH transmission). In this case, the at least one first slot index-dependent procedure may be performed using the index of the original first slot as the assumed index of the first slot of the PUCCH repetitions without considering whether the PUCCH repetitions may be deferred. After performing the first slot index-dependent procedure, UE 115 may perform the deferral procedure to postpone the transmission of the first PUCCH repetition (and thereby the transmission of all the PUCCH repetitions) to a deferred first slot. Therefore, instead of transmitting the PUCCH repetitions starting at the original first slot, UE 115 may transmit, or schedule to transmit, the PUCCH repetitions starting at the deferred first slot. Therefore, in these cases, despite the first PUCCH repetition being deferred (and thereby the first slot in which the first PUCCH repetition is transmitted), the first slot index-dependent procedure is performed based on the original first slot, as if the first PUCCH repetition were not deferred. As will be appreciated, in this case, the at least one first slot index-dependent procedure is not affected by the deferral procedure, as the deferral procedure is performed after the at least one first slot index-dependent procedure is determined to be performed using the original first slot.

In aspects, the sequential order for performing the deferral procedure and the at least one first slot index-dependent procedure may depend on the type of procedure of the at least one first slot index-dependent procedure. In these aspects, UE 115 (or base station 105) may determine what type of procedure the at least one first slot index-dependent procedure is. For example, UE 115 may determine whether the at least one first slot index-dependent procedure is a feedback reporting-related procedure, an uplink transmission prioritization procedure, etc. UE 115 (or base station 105 in some aspects) may then determine whether to perform the deferral procedure before or after the at least one first slot index-dependent procedure based on the type of procedure. For example, UE 115 may determine to perform a feedback reporting-related procedure before the deferral procedure. In another example, UE 115 may determine to perform an uplink transmission prioritization procedure after the deferral procedure. In any case, the sequential order of the procedures may be determined based on the type of the at least one first slot index-dependent procedure.

During operation of wireless communications system 400, UE 115 may perform the deferral procedure and the at least one first slot index-dependent procedure in the determined sequential order. It is noted that although the discussion herein describes a sequential order in which a deferral procedure is performed before or after at least one first slot index-dependent procedure, it should be understood that the procedures (e.g., the deferral procedure and/or the at least one first slot index-dependent procedure) may not necessarily be performed before or after one another. Indeed, as used herein, performing one procedure before another procedure may include merely determining to perform the procedure. For example, deferring a PUCCH repetition before a feedback reporting related procedure may not necessarily include transmitting the PUCCH repetition in a deferred slot before performing the feedback reporting related procedure. In this case, the feedback reporting related procedure may be performed using the deferred slot as the slot index of the first PUCCH repetition, even if the first PUCCH repetition has not been transmitted on the deferred slot yet.

During operation of wireless communications system 400, UE 115 may transmit the PUCCH repetitions 480 in accordance with the deferral procedure. For example, UE 115 may transmit PUCCH repetitions 480 in the deferred resources, where the first PUCCH repetition may be transmitted in the deferred first slot.

Figure 5A:
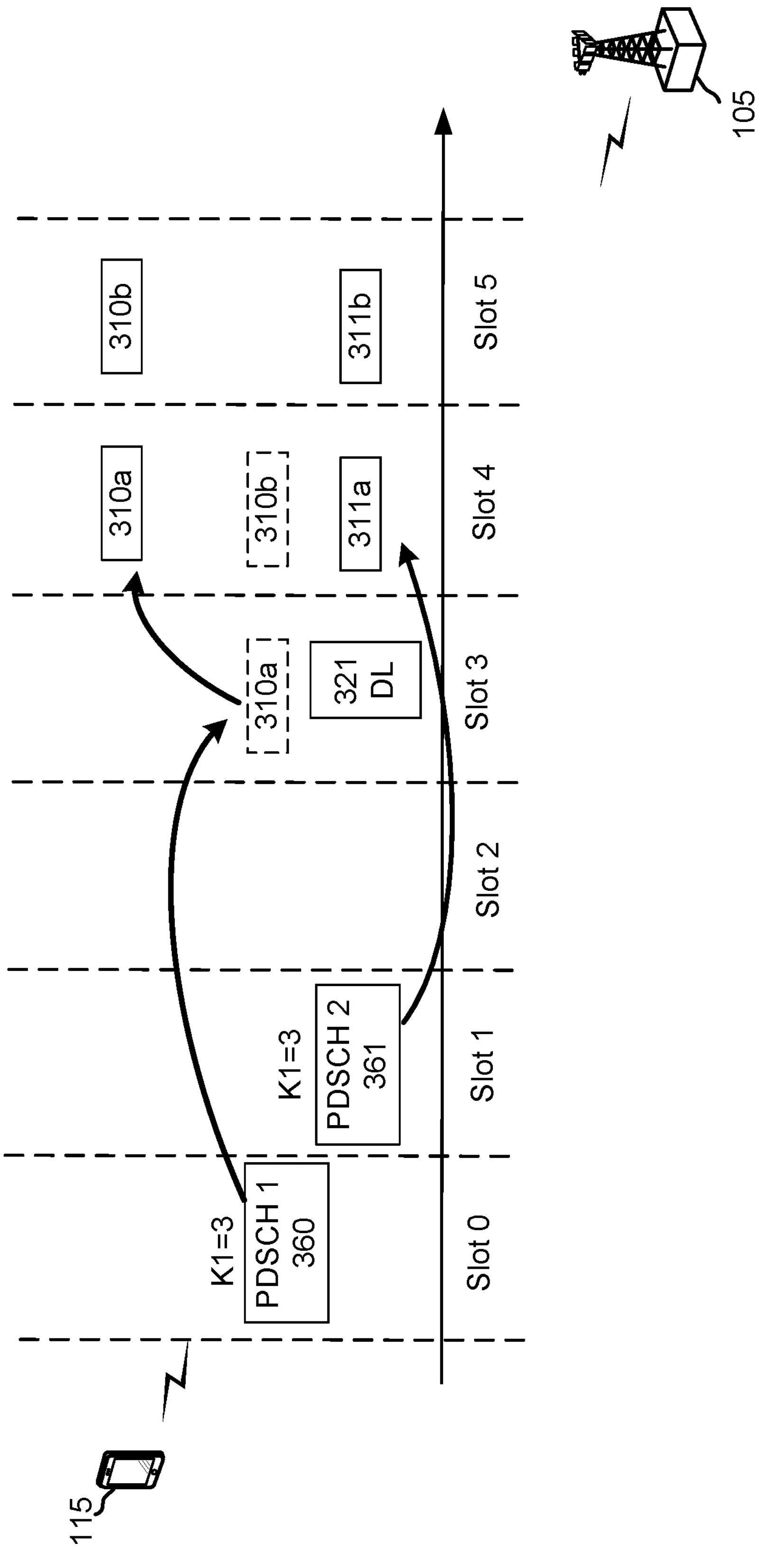
FIG. 5A shows a diagram illustrating an example of a feedback procedure and deferral procedure performed in a sequential order determined in accordance with aspects of the disclosure.

In aspects, the at least one first slot index-dependent procedure may include one or more of various procedures. In aspects, the at least one first slot index-dependent procedure may include a feedback generation procedure. FIG. 5A shows a diagram illustrating an example of a feedback procedure and deferral procedure performed in a sequential order determined in accordance with aspects of the disclosure. In aspects, hybrid automatic repeat request (HARQ) feedback may be implemented in wireless communication systems. In these implementations, a base station may configure a HARQ feedback from a UE by providing a transmission grant to the UE that includes a feedback timing indicator (K1) that indicates a relative position of a resource (e.g., a slot) in which the UE is to report the HARQ feedback (e.g., ACK/NACK) for a transmission from the base station to the UE. In aspects, the K1 indicator may also be referred to as a PDSCH to HARQ timing indicator.

For example, as shown in FIG. 5A, base station 105 may configure (e.g., via a downlink control indication message, such as in message 470, a radio resource configuration (RRC) message, or a semi-persistent scheduling (SPS) message) UE 115 to receive first PDSCH 360 in slot 0, and to receive second PDSCH 361 in slot 1. In addition, base station 105 may configure or schedule UE 115 to transmit a HARQ feedback for each of the first PDSCH 360 and the second PDSCH 361. For example, base station may transmit in the PDSCH grant for each of first PDSCH 360 and the second PDSCH 361 to UE 115 a corresponding K1 value. For example, a K1 value of three may be provided for the first PDSCH 360, and a K1 value of three may be provided for the second PDSCH 361. UE 115 may add the respective K1 value to the slot index in which a PDSCH is received to obtain the slot index of the slot in which the HARQ feedback for the PDSCH is to be transmitted. For example, as the first PDSCH 360 is received in slot 0, applying the K1 value of three results in UE 115 scheduling the HARQ feedback for first PDSCH 360 in slot 3 (0+3=3). Similarly, as the second PDSCH 361 is received in slot 1, applying the K1 value of three for the second PDSCH results in UE 115 scheduling the HARQ feedback for second PDSCH 361 in slot 4 (1+3=4).

In aspects, UE 115 may be configured to generate a HARQ-ACK codebook for the feedback to be reported for the PDSCH transmissions. In the case, where the feedback in a particular slot includes feedback for a single PDSCH reception, UE 115 may generate a HARQ-ACK codebook for the single feedback. On the other hand, where the feedback in a particular slot includes feedback for multiple PDSCH receptions, UE 115 may multiplex the HARQ feedback for the multiple PDSCH receptions, and may then generate single HARQ-ACK codebook for the multiple HARQ feedbacks to be transmitted in a same PUCCH transmission.

In addition, in aspects, UE 115 may be configured for PUCCH repetition. In this case, the PUCCH message in which the HARQ feedback is to be transmitted to base station 105 may be repeated in a plurality of slots. For example, the HARQ feedback 310 corresponding to first PDSCH 360 may be repeated by scheduling to transmit PUCCH repetitions 310*a* and 310*b*. As noted above, based on the K1 indicator for first PDSCH 360, the first repetition of the PUCCH carrying the HARQ feedback for first PDSCH 360 may be scheduled to be transmitted in slot 3. In a similar manner, the HARQ feedback 311 corresponding to second PDSCH 361 may be repeated by scheduling to transmit PUCCH repetitions 311*a* and 311*b*. As noted above, based on the K1 indicator for second PDSCH 361, the first repetition of the PUCCH carrying the HARQ feedback for second PDSCH 361 may be scheduled to be transmitted in slot 4. However, as shown in FIG. 5A, a symbol 321 in slot 3 in which PUCCH repetition 310*a* is scheduled to be transmitted to base station 105 may be determined (e.g., by UE 115) to be a downlink symbol (e.g., a semi-static downlink symbol). In response to the determination that a symbol of first PUCCH repetition 310*a* includes a downlink symbol, UE 115 may determine to perform a deferral procedure on PUCCH repetitions 310*a* and 310*b*.

Applying the deferral procedure on PUCCH repetitions 310*a* and 310*b* may include deferring or postponing PUCCH repetitions 310*a* and 310*b* to begin at slot 4, which is a slot that may not include a semi-static downlink symbol. In this manner, the first one of the PUCCH repetitions (e.g., first PUCCH repetition 310*a*) may be scheduled to be transmitted in deferred first slot 4, instead of the original first slot 3.

In this example illustrated in FIG. 5A, UE 115 may determine a sequential order in which to perform the deferral procedure and the HARQ-ACK-codebook generation procedure. In aspects, UE 115 may determine to perform the deferral procedure before the HARQ-ACK codebook generation procedure. In some of these aspects, UE 115 may determine to perform the deferral procedure before the HARQ-ACK codebook generation procedure based on predetermined configuration. In other aspects, UE 115 may first determine the type of procedure, and may determine that the HARQ-ACK codebook generation procedure is a feedback reporting-related procedure. In this case, UE 115 may determine to perform the deferral procedure before the HARQ-ACK codebook generation procedure based on the determination of the type of procedure of the HARQ-ACK codebook generation procedure. In these aspects, UE 115 may first postpone the PUCCH repetitions 310*a* and 310*b* to begin at slot 4, rather than begin at slot 3 as originally scheduled. As such, performing the deferral procedure results in a deferred first slot of index 4 (e.g., the slot index of the slot to which the first PUCCH repetition is deferred), rather than the original first slot 3. After performing the deferral procedure, UE 115 may perform the HARQ-ACK codebook generation procedure. In this case, the HARQ-ACK codebook generation procedure may be performed using the deferred first slot (e.g., slot 4) as the first slot of the PUCCH repetitions. As slot 4 is also the first slot of PUCCH repetitions carrying the HARQ feedback for second PDSCH 361, UE 115 may multiplex the HARQ feedback for both first PDSCH 360 and second PDSCH 361 in a same HARQ-ACK codebook to be used in the PUCCH to be repeated in slot 4 and slot 5.

In other aspects, UE 115 may determine to perform the deferral procedure after the HARQ-ACK codebook generation procedure. In these aspects, UE 115 may first perform the HARQ-ACK codebook generation procedure. In this case, UE 115 may use slot 3 as the index of the first PUCCH repetition for the PUCCH carrying the HARQ feedback for first PDSCH 360, and may use slot 4 as the index of the first PUCCH repetition for the PUCCH carrying the HARQ feedback for second PDSCH 361. In this example, as the first PUCCH repetition for the PUCCH carrying the HARQ feedback for first PDSCH 360, and the first PUCCH repetition for the PUCCH carrying the HARQ feedback for second PDSCH 361 are not scheduled for transmission in the same slot, UE 115 may generate separate HARQ-ACK codebooks for each set of PUCCH repetitions. For example, UE 115 may generate a HARQ-ACK codebook for the HARQ feedback for first PDSCH 360 to be used in a first PUCCH, and a separate HARQ-ACK codebook for the HARQ feedback for second PDSCH 361 to be used in a second PUCCH. After performing the HARQ-ACK codebook generation procedure, UE 115 may perform the deferral procedure. Performing the deferral procedure, as described above, may include deferring or postponing the PUCCH repetitions 310*a* and 310*b* to begin at slot 4, rather than begin at slot 3 as originally scheduled. As shown, slots 4 and 5 are also the slots in which PUCCH repetitions 311*a* and 311*b* carrying the HARQ feedback for second PDSCH 361 are scheduled to be transmitted. However, as different HARQ-ACK codebooks are generated by UE 115 for the HARQ feedback for first PDSCH 360 and the HARQ feedback for second PDSCH 361, the two HARQ feedbacks may not be transmitted in the same slot. In aspects, this situation may be determined to be an error and an in some aspects, UE 115 may drop either HARQ feedback transmission. In some aspects, this situation may be handled, as discussed throughout this application, by applying prioritization. In this case, as PUCCH repetitions 310*a* and 310*b*, and PUCCH repetitions 311*a* and 311*b* each carry HARQ-ACK feedback, UE 115 may use the starting slot index associated with each of PUCCH repetitions 310*a* and 310*b*, and 311*a* and 311*b* to determine which transmission (e.g., the transmission including PUCCH repetitions 310*a* and 310*b*, or the transmission including PUCCH repetitions 311*a* and 311*b*) to transmit and which transmission to drop. In the illustrated example, UE 115 may determine that PUCCH repetitions 310*a* and 310*b* were originally scheduled to start in slot 3, and PUCCH repetitions 311*a* and 311*b* were originally scheduled to start in slot 4. As such, in this case, UE 115 may prioritize PUCCH repetitions 310*a* and 310*b* over PUCCH repetitions 311*a* and 311*b*.

Figure 5B:
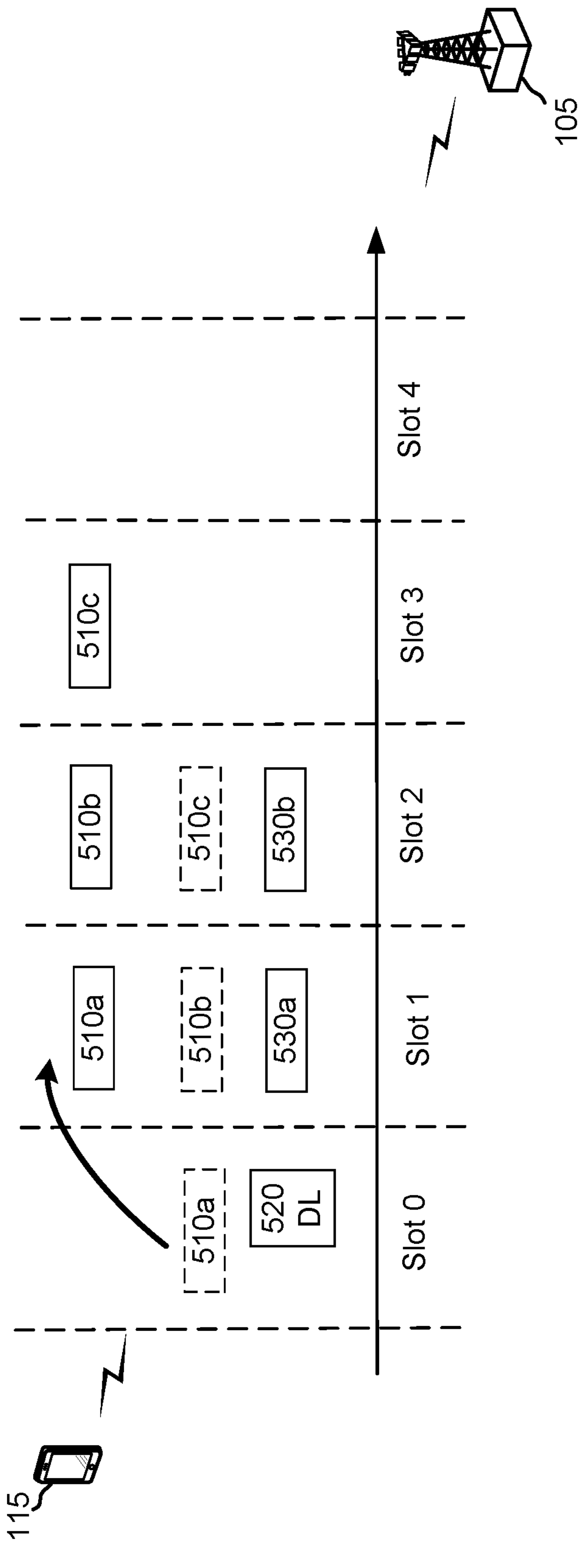
FIG. 5B shows a diagram illustrating an example of an uplink transmission prioritization procedure and deferral procedure performed in a sequential order determined in accordance with aspects of the disclosure.

In aspects, the at least one first slot index-dependent procedure may include an uplink transmission prioritization procedure. FIG. 5B shows a diagram illustrating an example of an uplink transmission prioritization procedure and deferral procedure performed in a sequential order determined in accordance with aspects of the disclosure. In wireless communication systems, an intra-UE prioritization procedure may be implemented. This prioritization procedure may include prioritizing uplink transmissions between each other. In these uplink transmission prioritization procedures, a first uplink transmission may be prioritized over a second uplink transmission, and the second uplink transmission may be dropped or postponed in favor of the first uplink transmission. For example, a first PUCCH (e.g., repetitions of a first PUCCH) may be prioritized against a second PUCCH (e.g., repetitions of a second PUCCH). In aspects, the PUCCH repetitions prioritization may be based on a type of the uplink control information (UCI) included in the PUCCH message being repeated. In aspects, a PUCCH carrying HARQ-ACK may be prioritized higher than a PUCCH carrying a scheduling request (SR) signal. In aspects, a PUCCH carrying an SR signal may be prioritized higher than a PUCCH carrying channel state information (CSI). Also, in aspects, a PUCCH carrying CSI of a higher priority may be prioritized higher than a PUCCH carrying CSI of a lower priority. In any case, where two PUCCH transmissions are to be transmitted in the same slot, the above prioritization rules may be applied. In this case, the PUCCH of higher priority may be transmitted, and the PUCCH of lower priority may be dropped. In some aspects, if two PUCCH transmissions have the same UCI type priority (e.g., both PUCCH transmissions include HARQ-ACK feedbacks, SR, or CSI reports), a PUCCH with repetitions scheduled to start earlier (e.g., scheduled to start at an earlier slot or subslot) may be prioritized over the PUCCH with repetitions scheduled to start later (e.g., scheduled to start at a later slot or subslot). In this case, the PUCCH with repetitions scheduled to start later may be dropped, and the PUCCH with repetitions scheduled to start earlier may be transmitted to the base station. Additionally, if two PUCCH transmissions have the same priority and have repetitions scheduled to start in the same slot, the UE may be configured to report an error or to discard the scheduling information that triggers the PUCCH transmissions.

For example, as shown in FIG. 5B, UE 115 may be originally configured or scheduled to transmit PUCCH repetitions 510*a*-510*c* beginning at slot 0. In this case, the PUCCH message being repeated in PUCCH repetitions 510*a*-510*c* may carry UCI of a first type. In this example, UE 115 may also be configured or scheduled to transmit PUCCH repetitions 530*a* and 530*b* beginning at slot 1. In this case, the PUCCH message being repeated in PUCCH repetitions 530*a* and 530*b* may carry UCI of a second type. As noted above, the PUCCH repetitions may be prioritized over each other based on the type of UCI being carried by the PUCCH. In this example, the first type of the UCI being carried in the PUCCH repetitions 510*a*-510*c* may have the same priority as the second type of the UCI being carried in the PUCCH repetitions 530*a* and 530*b*.

As shown in FIG. 5B, a symbol 520 in slot 0 in which PUCCH repetition 510*a* is originally scheduled to be transmitted to base station 105 may be determined (e.g., by UE 115) to be a downlink symbol (e.g., a semi-static downlink symbol). In response to the determination that a symbol of first PUCCH repetition 510*a* includes a downlink symbol, UE 115 may determine to perform a deferral procedure on PUCCH repetitions 510*a*-510*c*. Applying the deferral procedure on PUCCH repetitions 510*a*-510*c* may include deferring or postponing PUCCH repetitions 510*a*-510*c* to begin at slot 1, which is a slot that may not include a semi-static symbol. In this manner, the first slot of the PUCCH repetitions (e.g., first PUCCH repetition 510*a*) may be scheduled to be transmitted in deferred first slot 1, instead of the original first slot 0.

In the example illustrated in FIG. 5B, UE 115 may determine a sequential order in which to perform the deferral procedure and the uplink transmission prioritization procedure. In aspects, UE 115 may determine to perform the deferral procedure before the uplink transmission prioritization procedure. In some of these aspects, UE 115 may determine to perform the deferral procedure before the uplink transmission prioritization procedure based on predetermined configuration. In other aspects, UE 115 may first determine the type of procedure, and may determine that the uplink transmission prioritization procedure is a prioritization procedure. In this case, UE 115 may determine to perform the deferral procedure before the uplink transmission prioritization procedure based on the determination of the type of procedure of the uplink transmission prioritization procedure. In these aspects, UE 115 may first postpone PUCCH repetitions 510*a*-510*c* to begin at slot 1, rather than begin at slot 0 as originally scheduled. As such, performing the deferral procedure results in a deferred first slot of index 1 (e.g., the slot index of the slot to which the first PUCCH repetition is deferred), rather than the original first slot 0. After performing the deferral procedure, UE 115 may perform the uplink transmission prioritization procedure. In this case, the uplink transmission prioritization procedure may be performed using the deferred first slot (e.g., slot 1) as the first slot of PUCCH repetitions 510*a*-510*c* and of PUCCH repetitions 530*a* and 530*b*. However, in the example shown in FIG. 5B, this may result in an error condition, as slot 1 is also the first slot in which PUCCH repetitions 530*a* and 530*b* begin, and PUCCH repetitions 530*a* and 530*b* carry UCI of the same priority level as the UCI in PUCCH repetitions 510*a*-510*c*.

In other aspects, UE 115 may determine to perform the deferral procedure after the uplink transmission prioritization procedure. In these aspects, UE 115 may first perform the uplink transmission prioritization procedure. In this case, UE 115 may use slot 0 as the index of the first PUCCH repetition of PUCCH repetitions 510*a*-510*c*. UE 115 may also use slot 1 as the index of the first PUCCH repetition of PUCCH repetitions 530*a* and 530*b*. In this example, PUCCH repetitions 510*a*-510*c* may be prioritized higher than PUCCH repetitions 530*a* and 530*b* because PUCCH repetitions 510*a*-510*c* begin at an earlier slot than PUCCH repetitions 530*a* and 530*b* (e.g., the first slot index is 0 for PUCCH repetitions 510*a*-510*c* and the first slot index is 1 for PUCCH repetitions 530*a* and 530*b*), even though PUCCH repetitions 510*a*-510*c* and PUCCH repetitions 530*a* and 530*b* carry the same type of UCI. After performing the uplink transmission prioritization procedure, UE 115 may perform the deferral procedure. In this case, performing the deferral procedure, as described above, may include deferring or postponing the PUCCH repetitions 510*a*-510*c* to begin at slot 1, rather than begin at slot 0 as originally scheduled. Slot 1 is also the slot where the first PUCCH repetition of PUCCH repetitions 530*a* and 530*b* is scheduled to be transmitted. However, even though PUCCH repetitions 510*a*-510*c* and PUCCH repetitions 530*a* and 530*b* carry the same type of UCI, and even though, after deferral, PUCCH repetitions 510*a*-510*c* and PUCCH repetitions 530*a* and 530*b* are scheduled to begin in the same slot, because the uplink transmission prioritization procedure was performed before the deferral procedure, PUCCH repetitions 510*a*-510*c* are prioritized higher than PUCCH repetitions 530*a* and 530*b*. Therefore, in this example, PUCCH repetitions 530*a* and 530*b* may be dropped and PUCCH repetitions 510*a*-510*c* may be transmitted to base station 105.

In aspects, the at least one first slot index-dependent procedure may include an out of order (OoO) condition checking procedure. For example, scheduling limitations may be imposed by accepted communications standards. One example, of such scheduling limitations may include a scheduling limitation that requires that, in a given scheduled cell, a UE may not be expected to receive a first PDSCH transmission and a second PDSCH transmission starting later than the first PDSCH transmission, with the corresponding HARQ feedback transmission for the second PDSCH transmission to be transmitted on a PUCCH resource ending in a slot earlier than the start of the HARQ feedback transmission associated with the first PDSCH transmission. In aspects, the OoO condition checking procedure may include a procedure for determining an OoO condition between the first and the second PDSCH transmissions by checking whether the corresponding HARQ feedback transmissions are scheduled so as to meet the above scheduling restriction. For example, UE 115 may be scheduled to transmit the PUCCH transmission carrying the HARQ feedback associated with the first PDSCH transmission in a first resource and the PUCCH transmission carrying the HARQ feedback associated with the second PDSCH transmission in a second resource. In this example, the PUCCH transmission carrying the HARQ feedback associated with the first PDSCH transmission may be deferred to a later resource instead of the first resource. In this case, UE 115 may determine to perform a deferral procedure of the PUCCH transmission after the OoO condition checking procedure. For example, UE 115 may use the original resource (e.g., the first resource) in which the HARQ feedback is scheduled to be transmitted to check the OoO condition against the PUCCH transmission carrying the HARQ feedback associated with the second PDSCH transmission (e.g., the second resource). In this manner, the OoO is checked before the PUCCH deferral.

In aspects, UE 115 may determine to perform the deferral procedure of the PUCCH transmission carrying the HARQ feedback before the OoO condition checking procedure. In this case, UE 115 may use the later resource to which the PUCCH transmission is deferred, instead of the original resource (e.g., the first resource) in which the PUCCH transmission is scheduled, to check the OoO condition against the PUCCH transmission carrying the HARQ feedback associated with the second PDSCH transmission (e.g., the second resource). In this manner, the OoO is checked after the PUCCH deferral.

Another example of scheduling limitations that may be imposed by accepted communications standards may include a scheduling limitation that requires that, in a given scheduled cell, if a UE is scheduled to start a first PUSCH transmission starting in a first symbol j by a first PDCCH transmission ending in symbol i, the UE is not expected to be scheduled to transmit a second PUSCH transmission starting earlier than the end of the first PUSCH transmission by a second PDCCH transmission that ends later than symbol i. In this case, the OoO condition checking procedure may include a procedure for determining an OoO condition between the first and the second PUSCH transmissions to determine whether the scheduling of the first and second PUSCH transmissions meet the above scheduling restriction. However, in this example, the first PUSCH transmission may be deferred. In aspects, UE 115 may determine to perform the deferral procedure of the PUSCH transmission after the OoO condition checking procedure. In this case, UE 115 may use the original slot in which the first PUSCH transmission is scheduled to be transmitted to check the OoO condition against the second PUSCH transmission. In this case, as the PUSCH transmission deferral is performed after the OoO condition check, the second PUSCH transmission may be allowed to be scheduled prior to the end of the deferred first PUSCH transmission, as the OoO check is performed before the deferral.

In aspects, UE 115 may determine to perform the deferral procedure of the PUSCH transmission before the OoO condition checking procedure. In this case, UE 115 may use the slot to which the first PUSCH transmission is deferred, instead of the original slot in which the first PUSCH transmission is scheduled, to check the OoO condition against the second PUSCH transmission. In this case, as the PUSCH transmission deferral is performed before the OoO condition check against the second PUSCH transmission, the second PUSCH transmission may not be allowed to be scheduled prior to the end of the deferred first PUSCH transmission, and should therefore be scheduled to be transmitted after the end of the deferred first PUSCH transmission.

Figure 6:
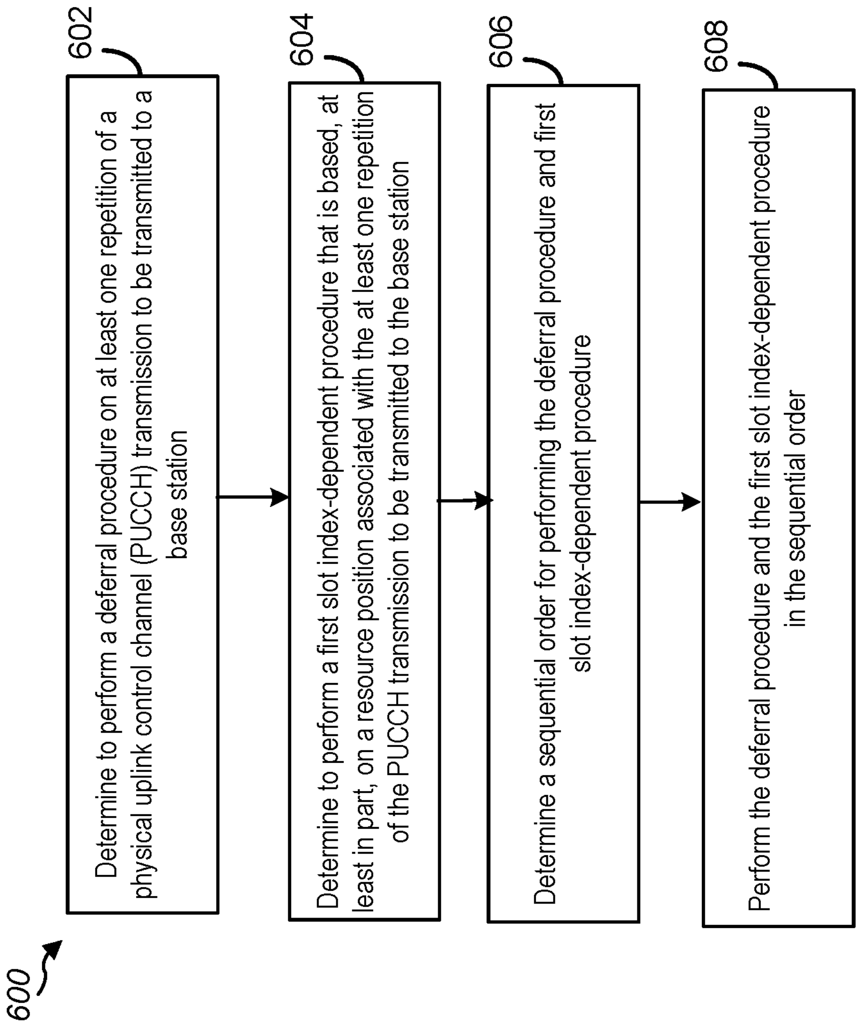
FIG. 6 is a flow diagram illustrating an example process that supports managing a sequential order for performing a deferral procedure and at least one other slot index-dependent procedure according to one or more aspects.
Figure 8:
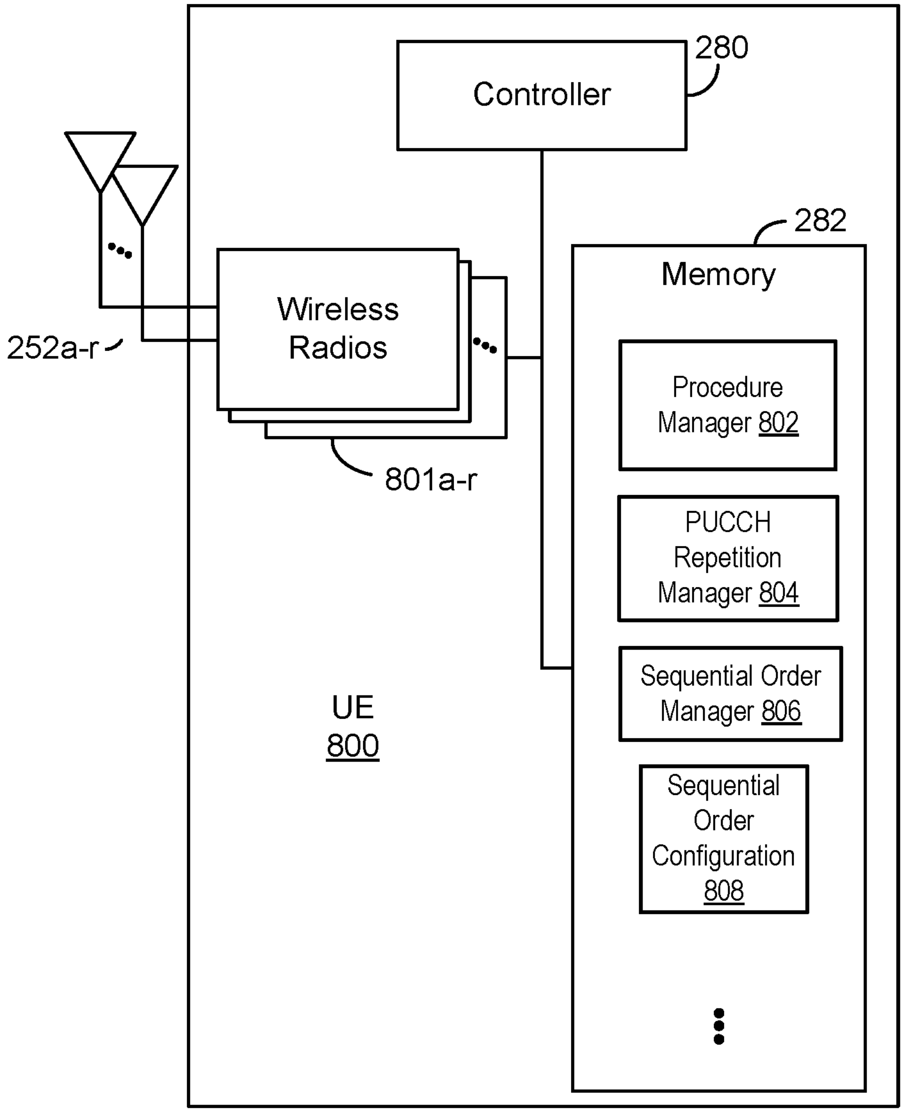
FIG. 8 is a block diagram of an example UE that supports managing a sequential order for performing a deferral procedure and at least one other slot index-dependent procedure according to one or more aspects.

FIG. 6 is a flow diagram illustrating an example process 600 that supports managing a sequential order for performing a deferral procedure and at least one other slot index-dependent procedure in a wireless communication system according to one or more aspects. Operations of the process illustrated in FIG. 6 may be performed by a UE, such as UE 115 described above with reference to FIGS. 1, 2, 3, 4, 5A, and 5B, or a UE 800 described with reference to FIG. 8. For example, example operations (also referred to as "blocks") of the process illustrated in FIG. 6 may enable UE 115, 800 to support managing a sequential order for performing a deferral procedure and at least one other slot index-dependent procedure. FIG. 8 is a block diagram illustrating UE 115, 800 configured according to aspects of the present disclosure. UE 115, 800 includes the structure, hardware, and components as illustrated for UE 115, 800 of FIG. 2. For example, UE 115, 800 includes controller/processor 280, which operates to execute logic or computer instructions stored in memory 282, as well as controlling the components of UE 115 that provide the features and functionality of UE 115, 800. UE 115, 800, under control of controller/processor 280, transmits and receives signals via wireless radios 801*a-r* and antennas 252*a-r*. Wireless radios 801*a-r* include various components and hardware, as illustrated in FIG. 2 for UE 115, including modulator/demodulators 254*a-r*, MIMO detector 256, receive processor 258, transmit processor 264, and TX MIMO processor 266.

At block 602 of process 600, a UE (e.g., UE 115, 800) determines to perform a deferral procedure on at least one repetition of a PUCCH transmission to be transmitted to a base station. In order to implement the functionality for such operations, UE 115, under control of controller/processor 280, executes procedure manager 802, stored in memory 282. The functionality implemented through the execution environment of procedure manager 802 allows for UE 115, 800 to perform deferral procedure related operations according to the various aspects herein.

In aspects, determining to perform the deferral procedure on the at least one repetition of the PUCCH transmission may include determining to postpone the first repetition (e.g., the beginning repetition or the repetition occurring first) of the at least one repetition to a later resource (e.g., a later slot) than a resource in which the beginning repetition of the at least one repetition is originally scheduled.

At block 604, the UE determines to perform a first slot index-dependent procedure that is based, at least in part, on a resource position associated with the at least one repetition of the PUCCH transmission to be transmitted to the base station. In order to implement the functionality for such operations, UE 115, 800, under control of controller/processor 280, executes procedure manager 802, stored in memory 282. The functionality implemented through the execution environment of procedure manager 802 allows for UE 115, 800 to perform first slot index-dependent procedure related operations according to the various aspects herein. For example, in some aspects, determining to perform the first slot index-dependent procedure may include determining to perform a HARQ feedback codebook generation procedure. In these aspects, the HARQ feedback codebook generation may be performed based on the index of the first slot in which the at least one repetition of the PUCCH transmission is scheduled to transmitted. In aspects, determining to perform the first slot index-dependent procedure may include determining to perform an uplink transmission prioritization procedure, such as an intra-UE prioritization of PUCCH repetitions, as described above. In these aspects, the UE may determine to determine a priority of the at least one repetition of the PUCCH transmission with respect to repetitions of another PUCCH transmission.

At block 606, the UE determines a sequential order for performing the deferral procedure and the first slot index-dependent procedure. At block 608, the UE performs the deferral procedure and the first slot index-dependent procedure in the sequential order. In order to implement the functionality for such operations, UE 115, 800, under control of controller/processor 280, executes sequential order manager 806, stored in memory 282. The functionality implemented through the execution environment of sequential order manager 806 allows for UE 115 to perform sequential order related operations according to the various aspects herein.

In some aspects, determining the sequential order for performing the deferral procedure and the first slot index-dependent procedure may include determining the sequential order based on a predetermined configuration (e.g., sequential order configuration 808), which may define the sequential order to be used by the UE for performing the deferral procedure and the first slot index-dependent procedure. In some aspects, determining the sequential order for performing the deferral procedure and the first slot index-dependent procedure may include receiving a configuration message from the base station, which may include an indication of the sequential order to be used by the UE for performing the deferral procedure and the first slot index-dependent procedure.

In aspects, determining the sequential order for performing the deferral procedure and the first slot index-dependent procedure may include determining to perform the deferral procedure before the first slot index-dependent procedure, determining to perform the deferral procedure after the first slot index-dependent procedure, or determining a type of the first slot index-dependent procedure and determining the sequential order based on the type of the first slot index-dependent procedure. In some aspects, where the sequential order may be based on the type of the first slot index-dependent procedure, the UE may determine to perform the first slot index-dependent procedure before the deferral procedure when the type of the first slot index-dependent procedure is a feedback reporting related procedure (e.g., a HARQ feedback codebook generation procedure). In some aspects, where the sequential order may be based on the type of the first slot index-dependent procedure, the UE may determine to perform the first slot index-dependent procedure after the deferral procedure when the type of the first slot index-dependent procedure is an uplink transmission prioritization procedure (e.g., a procedure to prioritize UCI in the PUCCH transmission with respect to UCI in another PUCCH transmission to be repeated).

Figure 7:
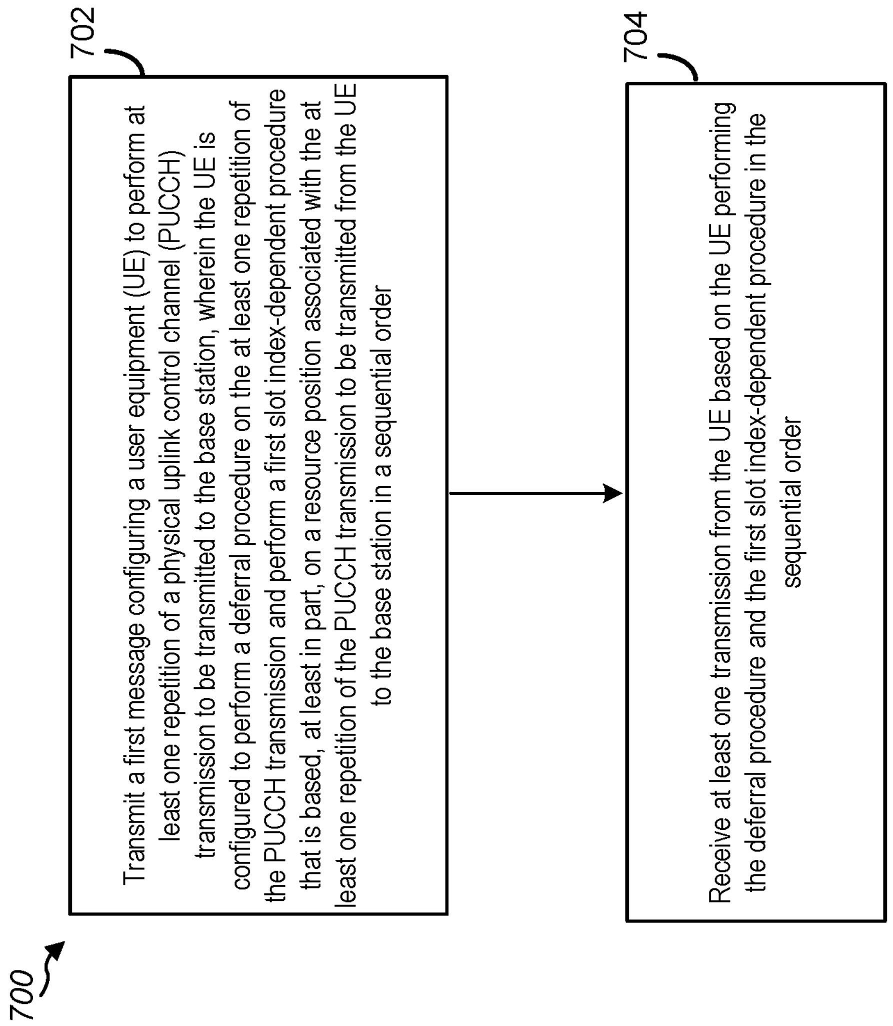
FIG. 7 is a flow diagram illustrating an example process that supports managing a sequential order for performing a deferral procedure and at least one other slot index-dependent procedure according to one or more aspects.
Figure 9:
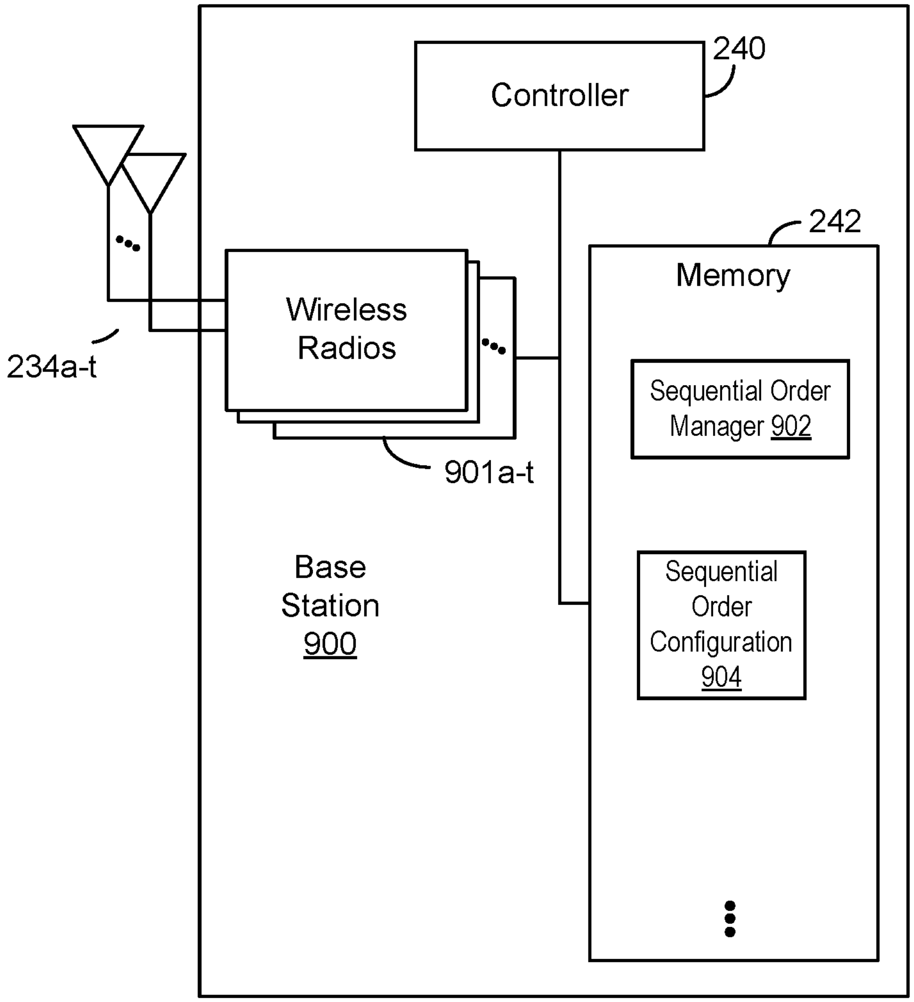
FIG. 9 is a block diagram of an example base station that supports managing a sequential order for performing a deferral procedure and at least one other slot index-dependent procedure according to one or more aspects.

FIG. 7 is a block diagram illustrating example blocks executed to implement one aspect of the present disclosure. Operations of the process illustrated in FIG. 7 may be performed by a network entity, for example a base station, such as base station 105 described above with reference to FIGS. 1, 2, 3, 4, 5A, and 5B, or a base station 900 described with reference to FIG. 9. FIG. 9 is a block diagram illustrating base station 105, 900 configured according to one aspect of the present disclosure. Base station 105, 900 includes the structure, hardware, and components as illustrated for base station 105 of FIG. 2. For example, base station 105, 900 includes controller/processor 240, which operates to execute logic or computer instructions stored in memory 242, as well as controlling the components of base station 105, 900 that provide the features and functionality of base station 105. Base station 105, 900, under control of controller/processor 240, transmits and receives signals via wireless radios 901*a-t* and antennas 234*a-t*. Wireless radios 901*a-t* include various components and hardware, as illustrated in FIG. 2 for base station 105, including modulator/demodulators 232*a-t*, MIMO detector 236, receive processor 238, transmit processor 220, and TX MIMO processor 230.

At block 702, a base station (e.g., base station 105, 900) transmits a first message configuring a UE (e.g., UE 115, 800) to perform at least one repetition of a PUCCH transmission to be transmitted to the base station. In aspects, the UE may be configured to perform a deferral procedure on the at least one repetition of the PUCCH transmission and perform a first slot index-dependent procedure that is based, at least in part, on a resource position associated with the at least one repetition of the PUCCH transmission to be transmitted from the UE to the base station in a sequential order.

In aspects, the base station may determine the sequential order in which the UE is to perform the deferral procedure and the first slot index-dependent procedure, and may then transmit a configuration message to the UE including an indication of the sequential order. In order to implement the functionality for such operations, base station 105, 900, under control of controller/processor 240, executes sequential order manager 902, stored in memory 242. The functionality implemented through the execution environment of sequential order manager 902 allows for base station 105, 900 to perform sequential order related operations according to the various aspects herein.

In aspects, determining the sequential order for the UE to perform the deferral procedure and the first slot index-dependent procedure may include determining the sequential order based on a predetermined configuration (e.g., sequential order configuration 904) stored in memory 242. In aspects, the predetermined configuration may define a sequential order to be used by the UE for performing the deferral procedure and the first slot index-dependent procedure.

At block 704, the base station receives at least one transmission from the UE based on the UE performing the deferral procedure and the first slot index-dependent procedure in the sequential order. For example, the base station (e.g., base station 105, 900) engaged in communications with the UE, may receive the at least one transmission from the UE via antennas 234*a-t* and wireless radios 901*a-t*.

In one or more aspects, techniques for providing managing a sequential order for performing a deferral procedure and at least one other slot index-dependent procedure in a wireless communication system according to one or more aspects may include additional aspects, such as any single aspect or any combination of aspects described below or in connection with one or more other processes or devices described elsewhere herein. In a first aspect, providing managing a sequential order for performing a deferral procedure and at least one other slot index-dependent procedure in a wireless communication system may include an apparatus configured to determine to perform a deferral procedure on at least one repetition of a PUCCH transmission to be transmitted to a base station, determine to perform a first slot index-dependent procedure that is based, at least in part, on a resource position associated with the at least one repetition of the PUCCH transmission to be transmitted to the base station, determine a sequential order for performing the deferral procedure and the first slot index-dependent procedure, and perform the deferral procedure and the first slot index-dependent procedure in the sequential order. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some other implementations, the apparatus may include a computer program product having program code and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the techniques of the first aspect include transmitting the at least one repetition of the PUCCH transmission to the base station based on the performing the deferral procedure and the first slot index-dependent procedure in the sequential order. In an implementation, the PUCCH transmission or the information contained in the PUCCH transmission is generated based on the first slot index-dependent procedure. The PUCCH transmission or the information contained in the PUCCH transmission generated based on the first slot index-dependent procedure performed in a certain sequential order with respect to the deferral procedure may be different from the PUCCH transmission or the information contained in the PUCCH transmission generated based on the first slot index-dependent procedure performed in a different sequential order with respect to the deferral procedure.

In a third aspect, alone or in combination with one or more of the first aspect or the second aspect, determining to perform the deferral procedure on the at least one repetition of the PUCCH transmission includes determining that a beginning repetition of the at least one repetition is originally scheduled to be transmitted, at least in part, in at least one semi-static downlink symbol.

In a fourth aspect, alone or in combination with one or more of the first aspect through the third aspect, determining to perform the deferral procedure on the at least one repetition of the PUCCH transmission includes determining to postpone the beginning repetition of the at least one repetition to a later resource than a resource in which the beginning repetition of the at least one repetition is originally scheduled.

In a fifth aspect, alone or in combination with one or more of the first aspect through the fourth aspect, determining to perform the first slot index-dependent procedure includes determining to perform a HARQ feedback codebook generation procedure.

In a sixth aspect, alone or in combination with the fifth aspect, determining to perform the first slot index-dependent procedure includes determining to perform an uplink transmission prioritization procedure.

In a seventh aspect, alone or in combination with one or more of the first aspect through the sixth aspect, determining the sequential order for performing the deferral procedure and the first slot index-dependent procedure includes receiving a configuration message from the base station, the configuration message including an indication of the sequential order to be used by the UE for performing the deferral procedure and the first slot index-dependent procedure.

In an eighth aspect, alone or in combination with one or more of the first aspect through the seventh aspect, determining the sequential order for performing the deferral procedure and the first slot index-dependent procedure includes determining the sequential order based on a predetermined configuration, the predetermined configuration defining a sequential order to be used by the UE for performing the deferral procedure and the first slot index-dependent procedure.

In a ninth aspect, alone or in combination with one or more of the first aspect through the eighth aspect, determining the sequential order for performing the deferral procedure and the first slot index-dependent procedure includes determining to perform the deferral procedure before the first slot index-dependent procedure.

In a tenth aspect, alone or in combination with the ninth aspect, determining the sequential order for performing the deferral procedure and the first slot index-dependent procedure includes determining to perform the deferral procedure after the first slot index-dependent procedure.

In an eleventh aspect, alone or in combination with one or more of the ninth aspect through the tenth aspect, determining the sequential order for performing the deferral procedure and the first slot index-dependent procedure includes determining a type of the first slot index-dependent procedure and determining the sequential order based on the type of the first slot index-dependent procedure.

In a twelfth aspect, alone or in combination with one or more of the first aspect through the eleventh aspect, determining the sequential order based on the type of the first slot index-dependent procedure includes determining to perform the first slot index-dependent procedure before the deferral procedure when the type of the first slot index-dependent procedure is a feedback reporting related procedure.

In a thirteenth aspect, alone or in combination with one or more of the first aspect through the twelfth aspect, the feedback reporting related procedure includes a HARQ feedback codebook generation procedure.

In a fourteenth aspect, alone or in combination with one or more of the first aspect through the thirteenth aspect, determining the sequential order based on the type of the first slot index-dependent procedure includes determining to perform the first slot index-dependent procedure after the deferral procedure when the type of the first slot index-dependent procedure is an uplink transmission prioritization procedure.

In a fifteenth aspect, alone or in combination with one or more of the first aspect through the fourteenth aspect, the uplink transmission prioritization procedure includes a procedure to prioritize UCI in the PUCCH transmission with respect to UCI in another PUCCH transmission to be repeated.

In a sixteenth aspect, alone or in combination with one or more of the first aspect through the fifteenth aspect, performing the deferral procedure includes postponing a beginning repetition of the at least one repetition of the PUCCH transmission to a later resource than a resource in which the beginning repetition of the at least one repetition is originally scheduled.

In a seventeenth aspect, alone or in combination with one or more of the first aspect through the sixteenth aspect, performing the deferral procedure and the first slot index-dependent procedure in the sequential order includes performing the first slot index-dependent procedure using the later resource as the resource of the beginning repetition instead of using the resource in which the beginning repetition of the at least one repetition is originally scheduled.

In an eighteenth aspect, providing managing a sequential order for performing a deferral procedure and at least one other slot index-dependent procedure in a wireless communication system may include an apparatus configured to transmit a first message configuring a UE to perform at least one repetition of a PUCCH transmission to be transmitted to the base station. The UE may be configured to perform a deferral procedure on the at least one repetition of the PUCCH transmission and to perform a first slot index-dependent procedure that is based, at least in part, on a resource position associated with the at least one repetition of the PUCCH transmission to be transmitted from the UE to the base station in a sequential order. The apparatus may be further configured to receive at least one transmission from the UE based on the UE performing the deferral procedure and the first slot index-dependent procedure in the sequential order. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some other implementations, the apparatus may include a computer program product having program code and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a nineteenth aspect, alone or in combination with the eighteenth aspect, the techniques of the eighteenth aspect include determining the sequential order in which the UE is to perform the deferral procedure and the first slot index-dependent procedure.

In a twentieth aspect, alone or in combination with the nineteenth aspect, the techniques of the eighteenth aspect include transmitting a configuration message to the UE including an indication of the sequential order.

In a twenty-first aspect, alone or in combination with one or more of the eighteenth aspect through the twentieth aspect, determining the sequential order for the UE to perform the deferral procedure and the first slot index-dependent procedure includes determining the sequential order based on a predetermined configuration, the predetermined configuration defining a sequential order to be used by the UE for performing the deferral procedure and the first slot index-dependent procedure.

In a twenty-second aspect, alone or in combination with one or more of the eighteenth aspect through the twenty-first aspect, the first slot index-dependent procedure includes a HARQ feedback codebook generation procedure.

In a twenty-third aspect, alone or in combination with the twenty-second aspect, the first slot index-dependent procedure includes an uplink transmission prioritization procedure.

In a twenty-fourth aspect, alone or in combination with one or more of the eighteenth aspect through the twenty-third aspect, the sequential order for the UE to perform the deferral procedure and the first slot index-dependent procedure includes determining to perform the deferral procedure before the first slot index-dependent procedure.

In a twenty-fifth aspect, alone or in combination with the twenty-fourth aspect, the sequential order for the UE to perform the deferral procedure and the first slot index-dependent procedure includes determining to perform the deferral procedure after the first slot index-dependent procedure.

In a twenty-sixth aspect, alone or in combination with one or more of the twenty-fourth aspect through the twenty-fifth aspect, the sequential order for the UE to perform the deferral procedure and the first slot index-dependent procedure includes determining a type of the first slot index-dependent procedure and determining the sequential order based on the type of the first slot index-dependent procedure.

In a twenty-seventh aspect, alone or in combination with one or more of the eighteenth aspect through the twenty-sixth aspect, determining the sequential order based on the type of the first slot index-dependent procedure includes determining to perform the first slot index-dependent procedure before the deferral procedure when the type of the first slot index-dependent procedure is a feedback reporting related procedure.

In a twenty-eighth aspect, alone or in combination with the twenty-seventh aspect, determining the sequential order based on the type of the first slot index-dependent procedure includes determining to perform the first slot index-dependent procedure after the deferral procedure when the type of the first slot index-dependent procedure is an uplink transmission prioritization procedure.

In a twenty-ninth aspect, alone or in combination with one or more of the eighteenth aspect through the twenty-eighth aspect, the feedback reporting related procedure includes a HARQ feedback codebook generation procedure.

In a thirtieth aspect, alone or in combination with one or more of the eighteenth aspect through the twenty-ninth aspect, the uplink transmission prioritization procedure includes a procedure to prioritize UCI in the PUCCH transmission with respect to UCI in another PUCCH transmission to be repeated.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 4, 6, and 7 include processors, electronics devices, hardware devices, electronics components, logical circuits, memories, software codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a graphics processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), flash memory, phase change memory, electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items (for example, prefaced by "at least one of") indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

In the following, further embodiments are provided to facilitate understanding the present invention:

1. A method of wireless communication performed by a user equipment, UE, the method comprising:
determining to perform a deferral procedure on at least one repetition of an uplink transmission to be transmitted to a network entity;
determining to perform a first slot index-dependent procedure that is based, at least in part, on a resource position associated with the at least one repetition of the uplink transmission to be transmitted to the network entity;
determining a sequential order for performing the deferral procedure and the first slot index-dependent procedure; and
performing the deferral procedure and the first slot index-dependent procedure in the sequential order.

2. The method of claim 1, further comprising:
transmitting the at least one repetition of the uplink transmission to the network entity based on the performing the deferral procedure and the first slot index-dependent procedure in the sequential order.

3. The method of claim 1, wherein determining to perform the deferral procedure on the at least one repetition of the uplink transmission includes determining that a beginning repetition of the at least one repetition is originally scheduled to be transmitted, at least in part, in at least one semi-static downlink symbol.

4. The method of claim 3, wherein determining to perform the deferral procedure on the at least one repetition of the uplink transmission includes determining to postpone the beginning repetition of the at least one repetition to a later resource than a resource in which the beginning repetition of the at least one repetition is originally scheduled.

5. The method of claim 1, wherein the first slot index-dependent procedure includes a hybrid automatic repeat request, HARQ, feedback codebook generation procedure, and wherein determining the sequential order for performing the deferral procedure and the first slot index-dependent procedure includes determining to perform the HARQ feedback codebook generation procedure before the deferral procedure.

6. The method of claim 5, wherein the HARQ feedback codebook generation procedure includes constructing a HARQ feedback codebook, prior to the deferral procedure, based on a starting resource of the at least one repetition of the uplink transmission.

7. The method of claim 1, wherein determining to perform the first slot index-dependent procedure includes determining to perform an uplink transmission prioritization procedure before the deferral procedure.

8. The method of claim 7, wherein the uplink transmission prioritization procedure includes a procedure to prioritize uplink control information, UCI, in the uplink transmission with respect to UCI in another uplink transmission.

9. The method of claim 8, wherein the UCI in the uplink transmission is prioritized with respect to UCI in the another uplink transmission based on a starting resource of the at least one repetition of the uplink transmission determined before the deferral procedure is performed.

10. The method of claim 1, wherein determining to perform the first slot index-dependent procedure includes determining to perform an out of order, OoO, condition checking procedure before performing the deferral procedure, wherein the OoO condition checking procedure includes determining whether scheduling of the uplink transmission and another uplink transmission meets a scheduling restriction.

11. The method of claim 7, wherein the uplink transmission carries hybrid automatic repeat request, HARQ, feedback associated with a first physical downlink shared channel, PDSCH, transmission, and wherein the another uplink transmission carries HARQ feedback associated with a second PDSCH transmission, and wherein determining to perform the OoO condition checking procedure before performing the deferral procedure includes:
determining whether transmission of the HARQ feedback associated with the second PDSCH transmission is scheduled to end in a resource occurring earlier than a resource in which transmission of the HARQ feedback associated with the first PDSCH transmission is scheduled to begin.

12. The method of claim 1, wherein determining the sequential order for performing the deferral procedure and the first slot index-dependent procedure includes:
determining the sequential order based on a predetermined configuration, the predetermined configuration defining a sequential order to be used by the UE for performing the deferral procedure and the first slot index-dependent procedure.

13. The method of claim 1, wherein determining the sequential order for performing the deferral procedure and the first slot index-dependent procedure includes one of:

determining to perform the deferral procedure before the first slot index-dependent procedure;

determining to perform the deferral procedure after the first slot index-dependent procedure; or determining a type of the first slot index-dependent procedure and determining the sequential order based on the type of the first slot index-dependent procedure.

14. The method of claim 13, wherein performing the deferral procedure includes:

postponing a beginning repetition of the at least one repetition of the uplink transmission to a later resource than a resource in which the beginning repetition of the at least one repetition is originally scheduled.

15. The method of claim 1, wherein performing the deferral procedure and the first slot index-dependent procedure in the sequential order includes:

performing the first slot index-dependent procedure using a later resource as the resource of a beginning repetition of the at least one repetition of the uplink transmission instead of using the beginning repetition of the at least one repetition as originally scheduled.

16. The method of claim 1, wherein the at least one repetition of the uplink transmission is configured to be one of:

slot-based repetition, wherein each of the at least one repetition of the uplink transmission is scheduled to occur in a respective slot; or subslot-based repetition, wherein each of the at least one repetition of the uplink transmission is scheduled to occur in a respective subslot of one or more slots.

17. The method of claim 1, wherein the uplink transmission is a physical uplink control channel, PUCCH, transmission.

18. A method of wireless communication performed by a network entity, the method comprising:

transmitting a first message configuring a user equipment, UE, to perform at least one repetition of an uplink transmission to be transmitted to the network entity and for configuring the UE to perform a deferral procedure on the at least one repetition of the uplink transmission and perform a first slot index-dependent procedure that is based, at least in part, on a resource position associated with the at least one repetition of the uplink transmission to be transmitted from the UE to the network entity in a sequential order; and receiving at least one transmission from the UE according to the deferral procedure and the first slot index-dependent procedure in the sequential order.

19. The method of claim 18, further comprising:

determining the sequential order in which the UE is to perform the deferral procedure and the first slot index-dependent procedure; and transmitting a configuration message to the UE including an indication of the sequential order.

20. The method of claim 19, wherein determining the sequential order for the UE to perform the deferral procedure and the first slot index-dependent procedure includes:

determining the sequential order based on a predetermined configuration, the predetermined configuration defining a sequential order to be used by the UE for performing the deferral procedure and the first slot index-dependent procedure.

21. The method of claim 18, wherein the first slot index-dependent procedure includes a hybrid automatic repeat request, HARQ, feedback codebook generation procedure to be performed before the deferral procedure.

22. The method of claim 21, wherein the HARQ feedback codebook generation procedure includes constructing a HARQ feedback codebook, prior to the deferral procedure, based on a starting resource of the at least one repetition of the uplink transmission.

23. The method of claim 18, wherein the first slot index-dependent procedure includes an uplink transmission prioritization procedure to be performed before the deferral procedure.

24. The method of claim 23, wherein the uplink transmission prioritization procedure includes a procedure to prioritize uplink control information, UCI, in the uplink transmission with respect to UCI in another uplink transmission.

25. The method of claim 24, wherein the UCI in the uplink transmission is prioritized with respect to the UCI in the another uplink transmission based on a starting resource of the at least one repetition of the uplink transmission determined before the deferral procedure is performed.

26. The method of claim 18, wherein the first slot index-dependent procedure includes an out of order, OoO, condition checking procedure to be performed before the deferral procedure, wherein the OoO condition checking procedure includes determining whether scheduling of the uplink transmission and another uplink transmission meets a scheduling restriction.

27. The method of claim 26, wherein the uplink transmission carries hybrid automatic repeat request, HARQ, feedback associated with a first physical downlink shared channel, PDSCH, transmission, and wherein the another uplink transmission carries HARQ feedback associated with a second PDSCH transmission, and wherein the OoO condition checking procedure includes:

determining whether transmission of the HARQ feedback associated with the second PDSCH transmission is scheduled to end in a resource occurring earlier than a resource in which transmission of the HARQ feedback associated with the first PDSCH transmission is scheduled to begin.

28. The method of claim 18, wherein the sequential order for the UE to perform the deferral procedure and the first slot index-dependent procedure includes one of:

determining to perform the deferral procedure before the first slot index-dependent procedure;

determining to perform the deferral procedure after the first slot index-dependent procedure; or determining a type of the first slot index-dependent procedure and determining the sequential order based on the type of the first slot index-dependent procedure.

29. The method of claim 18, wherein the at least one repetition of the uplink transmission is configured to be one of:

slot-based repetition, wherein each of the at least one repetition of the uplink transmission is scheduled to occur in a respective slot; or subslot-based repetition, wherein each of the at least one repetition of the uplink transmission is scheduled to occur in a respective subslot of one or more slots.

30. The method of claim 18, wherein the uplink transmission is a physical uplink control channel, PUCCH, transmission.

31. A user equipment, UE, comprising:
at least one processor; and
a memory coupled with the at least one processor and storing processor-readable code that, when executed by the at least one processor, is configured to perform operations including:
determining to perform a deferral procedure on at least one repetition of an uplink transmission to be transmitted to a network entity;
determining to perform a first slot index-dependent procedure that is based, at least in part, on a resource position associated with the at least one repetition of the uplink transmission to be transmitted to the network entity;
determining a sequential order for performing the deferral procedure and the first slot index-dependent procedure; and
performing the deferral procedure and the first slot index-dependent procedure in the sequential order.

32. The UE of claim 31, wherein the operations further comprise:
transmitting the at least one repetition of the uplink transmission to the network entity based on the performing the deferral procedure and the first slot index-dependent procedure in the sequential order.

33. The UE of claim 32, wherein determining to perform the deferral procedure on the at least one repetition of the uplink transmission includes determining that a beginning repetition of the at least one repetition is originally scheduled to be transmitted, at least in part, in at least one semi-static downlink symbol.

34. The UE of claim 33, wherein determining to perform the deferral procedure on the at least one repetition of the uplink transmission includes determining to postpone the beginning repetition of the at least one repetition to a later resource than a resource in which the beginning repetition of the at least one repetition is originally scheduled.

35. The UE of claim 31, wherein determining to perform the first slot index-dependent procedure includes determining to perform a hybrid automatic repeat request, HARQ, feedback codebook generation procedure before the deferral procedure.

36. The UE of claim 35, wherein the HARQ feedback codebook generation procedure includes constructing a HARQ feedback codebook, prior to the deferral procedure, based on a starting resource of the at least one repetition of the uplink transmission.

37. The UE of claim 31, wherein determining to perform the first slot index-dependent procedure includes determining to perform an uplink transmission prioritization procedure before the deferral procedure.

38. The UE of claim 37, wherein the uplink transmission prioritization procedure includes a procedure to prioritize uplink control information, UCI, in the uplink transmission with respect to UCI in another uplink transmission.

39. The UE of claim 38, wherein the UCI in the uplink transmission is prioritized with respect to the UCI in the another uplink transmission based on a starting resource of the at least one repetition of the uplink transmission determined before the deferral procedure is performed.

40. The UE of claim 31, wherein determining to perform the first slot index-dependent procedure includes determining to perform an out of order, OoO, condition checking procedure before performing the deferral procedure, wherein the OoO condition checking procedure includes determining whether scheduling of the uplink transmission and another uplink transmission meets a scheduling restriction.

41. The UE of claim 40, wherein the uplink transmission carries hybrid automatic repeat request, HARQ, feedback associated with a first physical downlink shared channel, PDSCH, transmission, and wherein the another uplink transmission carries HARQ feedback associated with a second PDSCH transmission, and wherein determining to perform the OoO condition checking procedure before performing the deferral procedure includes:
determining whether transmission of the HARQ feedback associated with the second PDSCH transmission is scheduled to end in a resource occurring earlier than a resource in which transmission of the HARQ feedback associated with the first PDSCH transmission is scheduled to begin.

42. The UE of claim 31, wherein determining the sequential order for performing the deferral procedure and the first slot index-dependent procedure includes:
determining the sequential order based on a predetermined configuration, the predetermined configuration defining a sequential order to be used by the UE for performing the deferral procedure and the first slot index-dependent procedure.

43. The UE of claim 31, wherein determining the sequential order for performing the deferral procedure and the first slot index-dependent procedure includes one of:
determining to perform the deferral procedure before the first slot index-dependent procedure;
determining to perform the deferral procedure after the first slot index-dependent procedure; or
determining a type of the first slot index-dependent procedure and determining the sequential order based on the type of the first slot index-dependent procedure.

44. The UE of claim 43, wherein performing the deferral procedure includes:
postponing a beginning repetition of the at least one repetition of the uplink transmission to a later resource than a resource in which the beginning repetition of the at least one repetition is originally scheduled.

45. The UE of claim 31, wherein performing the deferral procedure and the first slot index-dependent procedure in the sequential order includes:
performing the first slot index-dependent procedure using a later resource as the resource of a beginning repetition of the at least one repetition of the uplink transmission instead of using the beginning repetition of the at least one repetition as originally scheduled.

46. The UE of claim 31, wherein the at least one repetition of the uplink transmission is configured to be one of:
slot-based repetition, wherein each of the at least one repetition of the uplink transmission is scheduled to occur in a respective slot; or
subslot-based repetition, wherein each of the at least one repetition of the uplink transmission is scheduled to occur in a respective subslot of one or more slots.

47. The UE of claim 31, wherein the uplink transmission is a physical uplink control channel, PUCCH, transmission.

48. A network entity comprising:
at least one processor; and
a memory coupled with the at least one processor and storing processor-readable code that, when executed by the at least one processor, is configured to perform operations including:
transmitting a first message configuring a user equipment, UE, to perform at least one repetition of an uplink transmission to be transmitted to the network entity and for configuring the UE to perform a deferral procedure on the at least one repetition of the uplink transmission and perform a first slot index-dependent procedure that is based, at least in part, on a resource position associated with the at least one repetition of the uplink transmission to be transmitted from the UE to the network entity in a sequential order; and
receiving at least one transmission from the UE according to the deferral procedure and the first slot index-dependent procedure in the sequential order.

49. The network entity of claim 48, further comprising:
determining the sequential order in which the UE is to perform the deferral procedure and the first slot index-dependent procedure; and
transmitting a configuration message to the UE including an indication of the sequential order.

50. The network entity of claim 49, wherein determining the sequential order for the UE to perform the deferral procedure and the first slot index-dependent procedure includes:
determining the sequential order based on a predetermined configuration, the predetermined configuration defining a sequential order to be used by the UE for performing the deferral procedure and the first slot index-dependent procedure.

51. The network entity of claim 48, wherein the first slot index-dependent procedure includes a hybrid automatic repeat request, HARQ, feedback codebook generation procedure to be performed before the deferral procedure.

52. The network entity of claim 51, wherein the HARQ feedback codebook generation procedure includes constructing a HARQ feedback codebook, prior to the deferral procedure, based on a starting resource of the at least one repetition of the uplink transmission.

53. The network entity of claim 52, wherein the first slot index-dependent procedure includes an uplink transmission prioritization procedure to be performed before the deferral procedure.

54. The network entity of claim 53, wherein the uplink transmission prioritization procedure includes a procedure to prioritize uplink control information, UCI, in the uplink transmission with respect to UCI in another uplink transmission.

55. The network entity of claim 54, wherein the UCI in the uplink transmission is prioritized with respect to the UCI in the another uplink transmission based on a starting resource of the at least one repetition of the uplink transmission determined before the deferral procedure is performed.

56. The network entity of claim 48, wherein the first slot index-dependent procedure includes an out of order, OoO, condition checking procedure to be performed before the deferral procedure, wherein the OoO condition checking procedure includes determining whether scheduling of the uplink transmission and another uplink transmission meets a scheduling restriction.

57. The network entity of claim 56, wherein the uplink transmission carries hybrid automatic repeat request, HARQ, feedback associated with a first physical downlink shared channel, PDSCH, transmission, and wherein the another uplink transmission carries HARQ feedback associated with a second PDSCH transmission, and wherein the OoO condition checking procedure includes:
determining whether transmission of the HARQ feedback associated with the second PDSCH transmission is scheduled to end in a resource occurring earlier than a resource in which transmission of the HARQ feedback associated with the first PDSCH transmission is scheduled to begin.

58. The network entity of claim 48, wherein the sequential order for the UE to perform the deferral procedure and the first slot index-dependent procedure includes one of:
determining to perform the deferral procedure before the first slot index-dependent procedure;
determining to perform the deferral procedure after the first slot index-dependent procedure; or
determining a type of the first slot index-dependent procedure and determining the sequential order based on the type of the first slot index-dependent procedure.

59. The network entity of claim 48, wherein the at least one repetition of the uplink transmission is configured to be one of:
slot-based repetition, wherein each of the at least one repetition of the uplink transmission is scheduled to occur in a respective slot; or
subslot-based repetition, wherein each of the at least one repetition of the uplink transmission is scheduled to occur in a respective subslot of one or more slots.

60. The network entity of claim 48, wherein the uplink transmission is a physical uplink control channel, PUCCH, transmission.

61. A non-transitory computer-readable medium storing instructions that, when executed by a processor, cause the processor to perform operations comprising:
determining, by a user equipment, UE, to perform a deferral procedure on at least one repetition of an uplink transmission to be transmitted to a network entity;
determining to perform a first slot index-dependent procedure that is based, at least in part, on a resource position associated with the at least one repetition of the uplink transmission to be transmitted to the network entity;
determining a sequential order for performing the deferral procedure and the first slot index-dependent procedure; and
performing the deferral procedure and the first slot index-dependent procedure in the sequential order.

62. A non-transitory computer-readable medium storing instructions that, when executed by a processor, cause the processor to perform operations comprising:
transmitting a first message configuring a user equipment, UE, to perform at least one repetition of an uplink transmission to be transmitted to a network entity and for configuring the UE to perform a deferral procedure on the at least one repetition of the uplink transmission and perform a first slot index-dependent procedure that is based, at least in part, on a resource position associated with the at least one repetition of the uplink transmission to be transmitted from the UE to the network entity in a sequential order; and receiving at least one transmission from the UE according to the deferral procedure and the first slot index-dependent procedure in the sequential order.

63. An apparatus configured for wireless communication, the apparatus comprising:

means for determining, by a user equipment, to perform a deferral procedure on at least one repetition of an uplink transmission to be transmitted to a network entity;

means for determining to perform a first slot index-dependent procedure that is based, at least in part, on a resource position associated with the at least one repetition of the uplink transmission to be transmitted to the network entity;

means for determining a sequential order for performing the deferral procedure and the first slot index-dependent procedure; and means for performing the deferral procedure and the first slot index-dependent procedure in the sequential order.

64. An apparatus configured for wireless communication, the apparatus comprising:

means for transmitting a first message configuring a user equipment, UE, to perform at least one repetition of an uplink transmission to be transmitted to a network entity and means for configuring the UE to perform a deferral procedure on the at least one repetition of the uplink transmission and perform a first slot index-dependent procedure that is based, at least in part, on a resource position associated with the at least one repetition of the uplink transmission to be transmitted from the UE to the network entity in a sequential order; and means for receiving at least one transmission from the UE according to the deferral procedure and the first slot index-dependent procedure in the sequential order.

What is claimed is:

1. A method of wireless communication performed by a user equipment, UE, the method comprising:

determining to perform a deferral procedure on at least one repetition of an uplink transmission to be transmitted to a network entity;

determining to perform a first slot index-dependent procedure that is based, at least in part, on a resource position at which the at least one repetition of the uplink transmission is to be transmitted to the network entity;

determining a sequential order for performing the deferral procedure and the first slot index-dependent procedure when the first slot index-dependent procedure is determined to be performed based at least in part on the resource position, wherein determining the sequential order for performing the deferral procedure and the first slot index-dependent procedure is based on a type of the first slot index-dependent procedure, wherein the type identifies whether the first slot index-dependent procedure is associated with a feedback reporting-related procedure, an uplink transmission prioritization procedure, or an out-of-order condition checking procedure; and performing the deferral procedure and the first slot index-dependent procedure in the sequential order.

2. The method of claim 1, further comprising:

transmitting the at least one repetition of the uplink transmission to the network entity based on the performing the deferral procedure and the first slot index-dependent procedure in the sequential order.

3. The method of claim 1, wherein determining to perform the deferral procedure on the at least one repetition of the uplink transmission includes determining that a beginning repetition of the at least one repetition is originally scheduled to be transmitted, at least in part, in at least one semi-static downlink symbol.

4. The method of claim 3, wherein determining to perform the deferral procedure on the at least one repetition of the uplink transmission includes determining to postpone the beginning repetition of the at least one repetition to a later resource than a resource in which the beginning repetition of the at least one repetition is originally scheduled.

5. The method of claim 1, wherein the first slot index-dependent procedure includes a hybrid automatic repeat request, HARQ, feedback codebook generation procedure, and wherein determining the sequential order for performing the deferral procedure and the first slot index-dependent procedure includes determining to perform the HARQ feedback codebook generation procedure before the deferral procedure based on the type, wherein the type is associated with the HARQ feedback codebook generation procedure.

6. The method of claim 5, wherein the HARQ feedback codebook generation procedure includes constructing a HARQ feedback codebook, prior to the deferral procedure, based on a starting resource of the at least one repetition of the uplink transmission.

7. The method of claim 1, wherein determining to perform the first slot index-dependent procedure includes determining to perform an uplink transmission prioritization procedure before the deferral procedure.

8. The method of claim 7, wherein the uplink transmission prioritization procedure includes a procedure to prioritize uplink control information, UCI, in the uplink transmission with respect to UCI in another uplink transmission.

9. The method of claim 8, wherein the UCI in the uplink transmission is prioritized with respect to the UCI in the another uplink transmission based on a starting resource of the at least one repetition of the uplink transmission determined before the deferral procedure is performed.

10. The method of claim 1, wherein the first slot index-dependent procedure includes an out of order, OoO, condition checking procedure, wherein determining the sequential order for performing the deferral procedure and the first slot index-dependent procedure includes determining to perform the OoO condition checking procedure before performing the deferral procedure, wherein the OoO condition checking procedure includes determining whether scheduling of the uplink transmission and another uplink transmission meets a scheduling restriction.

11. The method of claim 7, wherein the uplink transmission carries hybrid automatic repeat request, HARQ, feedback associated with a first physical downlink shared channel, PDSCH, transmission, wherein the another uplink transmission carries HARQ feedback associated with a second PDSCH transmission, and wherein the OoO condition checking procedure includes:

determining whether transmission of the HARQ feedback associated with the second PDSCH transmission is scheduled to end in a resource occurring earlier than a resource in which transmission of the HARQ feedback associated with the first PDSCH transmission is scheduled to begin based on a starting resource of the at least one repetition of the uplink transmission determined before the deferral procedure is performed.

12. The method of claim 1, wherein determining the sequential order for performing the deferral procedure and the first slot index-dependent procedure includes:

determining the sequential order based on a predetermined configuration, the predetermined configuration defining a sequential order to be used by the UE for performing the deferral procedure and the first slot index-dependent procedure.

13. The method of claim 1, wherein determining the sequential order for performing the deferral procedure and the first slot index-dependent procedure includes one of:

determining to perform the deferral procedure before the first slot index-dependent procedure; or determining to perform the deferral procedure after the first slot index-dependent procedure.

14. The method of claim 13, wherein performing the deferral procedure includes:

postponing a beginning repetition of the at least one repetition of the uplink transmission to a later resource than a resource in which the beginning repetition of the at least one repetition is originally scheduled.

15. The method of claim 1, wherein performing the deferral procedure and the first slot index-dependent procedure in the sequential order includes:

performing the first slot index-dependent procedure using a later resource as the resource of a beginning repetition of the at least one repetition of the uplink transmission instead of using the resource of the beginning repetition of the at least one repetition as originally scheduled.

16. The method of claim 1, wherein the at least one repetition of the uplink transmission is configured to be one of:

slot-based repetition, wherein each of the at least one repetition of the uplink transmission is scheduled to occur in a respective slot; or subslot-based repetition, wherein each of the at least one repetition of the uplink transmission is scheduled to occur in a respective subslot of one or more slots.

17. The method of claim 1, wherein the uplink transmission is a physical uplink control channel, PUCCH, transmission.

18. A method of wireless communication performed by a network entity, the method comprising:

transmitting a first message for configuring a user equipment, UE, to perform at least one repetition of an uplink transmission to be transmitted to the network entity and for configuring the UE to perform a deferral procedure and a first slot index-dependent procedure in a sequential order, wherein the UE is to perform the deferral procedure on the at least one repetition of the uplink transmission and perform the first slot index-dependent procedure that is based, at least in part, on a resource position at which the at least one repetition of the uplink transmission is to be transmitted from the UE to the network entity, wherein the sequential order for performing the deferral procedure and the first slot index-dependent procedure is based on a type of the first slot index-dependent procedure, wherein the type identifies whether the first slot index-dependent procedure is associated with a feedback reporting-related procedure, an uplink transmission prioritization procedure, or an out-of-order condition checking procedure; and receiving at least one transmission from the UE according to the deferral procedure and the first slot index-dependent procedure in the sequential order when the first slot index-dependent procedure is determined to be performed.

19. The method of claim 18, further comprising:

determining the sequential order in which the UE is to perform the deferral procedure and the first slot index-dependent procedure; and transmitting a configuration message to the UE including an indication of the sequential order.

20. The method of claim 19, wherein determining the sequential order for the UE to perform the deferral procedure and the first slot index-dependent procedure includes:

determining the sequential order based on a predetermined configuration, the predetermined configuration defining a sequential order to be used by the UE for performing the deferral procedure and the first slot index-dependent procedure.

21. The method of claim 18, wherein the first slot index-dependent procedure includes a hybrid automatic repeat request, HARQ, feedback codebook generation procedure to be performed before the deferral procedure based on the type, wherein the type is associated with the HARQ feedback codebook generation procedure.

22. The method of claim 21, wherein the HARQ feedback codebook generation procedure includes constructing a HARQ feedback codebook, prior to the deferral procedure, based on a starting resource of the at least one repetition of the uplink transmission.

23. The method of claim 18, wherein the first slot index-dependent procedure includes an uplink transmission prioritization procedure to be performed before the deferral procedure.

24. The method of claim 23, wherein the uplink transmission prioritization procedure includes a procedure to prioritize uplink control information, UCI, in the uplink transmission with respect to UCI in another uplink transmission.

25. The method of claim 24, wherein the UCI in the uplink transmission is prioritized with respect to the UCI in the another uplink transmission based on a starting resource of the at least one repetition of the uplink transmission determined before the deferral procedure is performed.

26. The method of claim 18, wherein the first slot index-dependent procedure includes an out of order, OoO, condition checking procedure, wherein determining the sequential order for performing the deferral procedure and the first slot index-dependent procedure includes determining to perform the OoO condition checking procedure before performing the deferral procedure, wherein the OoO condition checking procedure includes determining whether scheduling of the uplink transmission and another uplink transmission meets a scheduling restriction.

27. The method of claim 26, wherein the uplink transmission carries hybrid automatic repeat request, HARQ, feedback associated with a first physical downlink shared channel, PDSCH, transmission, and wherein the another uplink transmission carries HARQ feedback associated with a second PDSCH transmission, and wherein the OoO condition checking procedure includes:

determining whether transmission of the HARQ feedback associated with the second PDSCH transmission is scheduled to end in a resource occurring earlier than a resource in which transmission of the HARQ feedback associated with the first PDSCH transmission is scheduled to begin based on a starting resource of the at least one repetition of the uplink transmission determined before the deferral procedure is performed.

28. The method of claim 18, wherein the sequential order for the UE to perform the deferral procedure and the first slot index-dependent procedure includes one of:

determining to perform the deferral procedure before the first slot index-dependent procedure; or determining to perform the deferral procedure after the first slot index-dependent procedure.

29. The method of claim 18, wherein the at least one repetition of the uplink transmission is configured to be one of:

slot-based repetition, wherein each of the at least one repetition of the uplink transmission is scheduled to occur in a respective slot; or subslot-based repetition, wherein each of the at least one repetition of the uplink transmission is scheduled to occur in a respective subslot of one or more slots.

30. The method of claim 18, wherein the uplink transmission is a physical uplink control channel, PUCCH, transmission.

31. A user equipment, UE, comprising:

at least one processor; and a memory coupled with the at least one processor and storing processor-readable code that, when executed by the at least one processor, is configured to perform operations including:

determining to perform a deferral procedure on at least one repetition of an uplink transmission to be transmitted to a network entity;

determining to perform a first slot index-dependent procedure that is based, at least in part, on a resource position at which the at least one repetition of the uplink transmission is to be transmitted to the network entity;

determining a sequential order for performing the deferral procedure and the first slot index-dependent procedure when the first slot index-dependent procedure is determined to be performed, wherein determining the sequential order for performing the deferral procedure and the first slot index-dependent procedure is based on a type of the first slot index-dependent procedure, wherein the type identifies whether the first slot index-dependent procedure is associated with a feedback reporting-related procedure, an uplink transmission prioritization procedure, or an out-of-order condition checking procedure; and performing the deferral procedure and the first slot index-dependent procedure in the sequential order.

32. The UE of claim 31, wherein the operations further comprise:

transmitting the at least one repetition of the uplink transmission to the network entity based on the performing the deferral procedure and the first slot index-dependent procedure in the sequential order.

33. The UE of claim 32, wherein determining to perform the deferral procedure on the at least one repetition of the uplink transmission includes determining that a beginning repetition of the at least one repetition is originally scheduled to be transmitted, at least in part, in at least one semi-static downlink symbol.

34. The UE of claim 33, wherein determining to perform the deferral procedure on the at least one repetition of the uplink transmission includes determining to postpone the beginning repetition of the at least one repetition to a later resource than a resource in which the beginning repetition of the at least one repetition is originally scheduled.

35. The UE of claim 31, wherein determining to perform the first slot index-dependent procedure includes determining to perform a hybrid automatic repeat request, HARQ, feedback codebook generation procedure before the deferral procedure based on the type, wherein the type is associated with the HARQ feedback codebook generation procedure.

36. The UE of claim 35, wherein the HARQ feedback codebook generation procedure includes constructing a HARQ feedback codebook, prior to the deferral procedure, based on a starting resource of the at least one repetition of the uplink transmission.

37. The UE of claim 31, wherein determining to perform the first slot index-dependent procedure includes determining to perform an uplink transmission prioritization procedure before the deferral procedure.

38. The UE of claim 37, wherein the uplink transmission prioritization procedure includes a procedure to prioritize uplink control information, UCI, in the uplink transmission with respect to UCI in another uplink transmission.

39. The UE of claim 38, wherein the UCI in the uplink transmission is prioritized with respect to the UCI in the another uplink transmission based on a starting resource of the at least one repetition of the uplink transmission determined before the deferral procedure is performed.

40. The UE of claim 31, wherein the first slot index-dependent procedure includes an out of order, OoO, condition checking procedure, wherein determining the sequential order for performing the deferral procedure and the first slot index-dependent procedure includes determining to perform the OoO condition checking procedure before performing the deferral procedure, wherein the OoO condition checking procedure includes determining whether scheduling of the uplink transmission and another uplink transmission meets a scheduling restriction.

41. The UE of claim 40, wherein the uplink transmission carries hybrid automatic repeat request, HARQ, feedback associated with a first physical downlink shared channel, PDSCH, transmission, wherein the another uplink transmission carries HARQ feedback associated with a second PDSCH transmission, and wherein the OoO condition checking procedure includes:

determining whether transmission of the HARQ feedback associated with the second PDSCH transmission is scheduled to end in a resource occurring earlier than a resource in which transmission of the HARQ feedback associated with the first PDSCH transmission is scheduled to begin based on a starting resource of the at least one repetition of the uplink transmission determined before the deferral procedure is performed.

42. The UE of claim 31, wherein determining the sequential order for performing the deferral procedure and the first slot index-dependent procedure includes:

determining the sequential order based on a predetermined configuration, the predetermined configuration defining a sequential order to be used by the UE for performing the deferral procedure and the first slot index-dependent procedure.

43. The UE of claim 31, wherein determining the sequential order for performing the deferral procedure and the first slot index-dependent procedure includes one of:

determining to perform the deferral procedure before the first slot index-dependent procedure; or determining to perform the deferral procedure after the first slot index-dependent procedure.

44. The UE of claim 43, wherein performing the deferral procedure includes:

postponing a beginning repetition of the at least one repetition of the uplink transmission to a later resource than a resource in which the beginning repetition of the at least one repetition is originally scheduled.

45. The UE of claim 31, wherein performing the deferral procedure and the first slot index-dependent procedure in the sequential order includes:

performing the first slot index-dependent procedure using a later resource as the resource of a beginning repetition of the at least one repetition of the uplink transmission instead of using the resource of the beginning repetition of the at least one repetition as originally scheduled.

46. The UE of claim 31, wherein the at least one repetition of the uplink transmission is configured to be one of:

slot-based repetition, wherein each of the at least one repetition of the uplink transmission is scheduled to occur in a respective slot; or subslot-based repetition, wherein each of the at least one repetition of the uplink transmission is scheduled to occur in a respective subslot of one or more slots.

47. The UE of claim 31, wherein the uplink transmission is a physical uplink control channel, PUCCH, transmission.

48. A network entity comprising:

at least one processor; and a memory coupled with the at least one processor and storing processor-readable code that, when executed by the at least one processor, is configured to perform operations including:

transmitting a first message for configuring a user equipment, UE, to perform at least one repetition of an uplink transmission to be transmitted to the network entity and for configuring the UE to perform a deferral procedure and a first slot index-dependent procedure in a sequential order, wherein the UE is to perform the deferral procedure on the at least one repetition of the uplink transmission and perform the first slot index-dependent procedure that is based, at least in part, on a resource position at which the at least one repetition of the uplink transmission is to be transmitted from the UE to the network entity, wherein the sequential order for performing the deferral procedure and the first slot index-dependent procedure is based on a type of the first slot index-dependent procedure, wherein the type identifies whether the first slot index-dependent procedure is associated with a feedback reporting-related procedure, an uplink transmission prioritization procedure, or an out-of-order condition checking procedure; and receiving at least one transmission from the UE according to the deferral procedure and the first slot index-dependent procedure in the sequential order when the first slot index-dependent procedure is determined to be performed.

49. The network entity of claim 48, further comprising:

determining the sequential order in which the UE is to perform the deferral procedure and the first slot index-dependent procedure; and transmitting a configuration message to the UE including an indication of the sequential order.

50. The network entity of claim 49, wherein determining the sequential order for the UE to perform the deferral procedure and the first slot index-dependent procedure includes:

determining the sequential order based on a predetermined configuration, the predetermined configuration defining a sequential order to be used by the UE for performing the deferral procedure and the first slot index-dependent procedure.

51. The network entity of claim 48, wherein the first slot index-dependent procedure includes a hybrid automatic repeat request, HARQ, feedback codebook generation procedure to be performed before the deferral procedure based on the type, wherein the type is associated with the HARQ feedback codebook generation procedure.

52. The network entity of claim 51, wherein the HARQ feedback codebook generation procedure includes constructing a HARQ feedback codebook, prior to the deferral procedure, based on a starting resource of the at least one repetition of the uplink transmission.

53. The network entity of claim 52, wherein the first slot index-dependent procedure includes an uplink transmission prioritization procedure to be performed before the deferral procedure.

54. The network entity of claim 53, wherein the uplink transmission prioritization procedure includes a procedure to prioritize uplink control information, UCI, in the uplink transmission with respect to UCI in another uplink transmission.

55. The network entity of claim 54, wherein the UCI in the uplink transmission is prioritized with respect to the UCI in the another uplink transmission based on a starting resource of the at least one repetition of the uplink transmission determined before the deferral procedure is performed.

56. The network entity of claim 48, wherein the first slot index-dependent procedure includes an out of order, OoO, condition checking procedure, wherein determining the sequential order for performing the deferral procedure and the first slot index-dependent procedure includes determining to perform the OoO condition checking procedure before performing the deferral procedure, wherein the OoO condition checking procedure includes determining whether scheduling of the uplink transmission and another uplink transmission meets a scheduling restriction.

57. The network entity of claim 56, wherein the uplink transmission carries hybrid automatic repeat request, HARQ, feedback associated with a first physical downlink shared channel, PDSCH, transmission, and wherein the another uplink transmission carries HARQ feedback associated with a second PDSCH transmission, and wherein the OoO condition checking procedure includes:

determining whether transmission of the HARQ feedback associated with the second PDSCH transmission is scheduled to end in a resource occurring earlier than a resource in which transmission of the HARQ feedback associated with the first PDSCH transmission is scheduled to begin based on a starting resource of the at least one repetition of the uplink transmission determined before the deferral procedure is performed.

58. The network entity of claim 48, wherein the sequential order for the UE to perform the deferral procedure and the first slot index-dependent procedure includes one of:

determining to perform the deferral procedure before the first slot index-dependent procedure; or determining to perform the deferral procedure after the first slot index-dependent procedure.

59. The network entity of claim 48, wherein the at least one repetition of the uplink transmission is configured to be one of:

slot-based repetition, wherein each of the at least one repetition of the uplink transmission is scheduled to occur in a respective slot; or subslot-based repetition, wherein each of the at least one repetition of the uplink transmission is scheduled to occur in a respective subslot of one or more slots.

60. The network entity of claim 48, wherein the uplink transmission is a physical uplink control channel, PUCCH, transmission.

61. A non-transitory computer-readable medium storing instructions that, when executed by a processor, cause the processor to perform operations comprising:

determining, by a user equipment, UE, to perform a deferral procedure on at least one repetition of an uplink transmission to be transmitted to a network entity;

determining to perform a first slot index-dependent procedure that is based, at least in part, on a resource position at which the at least one repetition of the uplink transmission is to be transmitted to the network entity;

determining a sequential order for performing the deferral procedure and the first slot index-dependent procedure when the first slot index-dependent procedure is determined to be performed, wherein determining the sequential order for performing the deferral procedure and the first slot index-dependent procedure is based on a type of the first slot index-dependent procedure, wherein the type identifies whether the first slot index-dependent procedure is associated with a feedback reporting-related procedure, an uplink transmission prioritization procedure, or an out-of-order condition checking procedure; and performing the deferral procedure and the first slot index-dependent procedure in the sequential order.

62. A non-transitory computer-readable medium storing instructions that, when executed by a processor, cause the processor to perform operations comprising:

transmitting a first message for configuring a user equipment, UE, to perform at least one repetition of an uplink transmission to be transmitted to a network entity and for configuring the UE to perform a deferral procedure and a first slot index-dependent procedure in a sequential order, wherein the UE is to perform the deferral procedure on the at least one repetition of the uplink transmission and perform the first slot index-dependent procedure that is based, at least in part, on a resource position at which the at least one repetition of the uplink transmission is to be transmitted from the UE to the network entity, wherein the sequential order for performing the deferral procedure and the first slot index-dependent procedure is based on a type of the first slot index-dependent procedure, wherein the type identifies whether the first slot index-dependent procedure is associated with a feedback reporting-related procedure, an uplink transmission prioritization procedure, or an out-of-order condition checking procedure; and receiving at least one transmission from the UE according to the deferral procedure and the first slot index-dependent procedure in the sequential order when the first slot index-dependent procedure is determined to be performed.

63. An apparatus configured for wireless communication, the apparatus comprising:

means for determining, by a user equipment, to perform a deferral procedure on at least one repetition of an uplink transmission to be transmitted to a network entity;

means for determining to perform a first slot index-dependent procedure that is based, at least in part, on a resource position at which the at least one repetition of the uplink transmission is to be transmitted to the network entity;

means for determining a sequential order for performing the deferral procedure and the first slot index-dependent procedure when the first slot index-dependent procedure is determined to be performed, wherein the sequential order for performing the deferral procedure and the first slot index-dependent procedure is based on a type of the first slot index-dependent procedure, wherein the type identifies whether the first slot index-dependent procedure is associated with a feedback reporting-related procedure, an uplink transmission prioritization procedure, or an out-of-order condition checking procedure; and means for performing the deferral procedure and the first slot index-dependent procedure in the sequential order.

64. An apparatus configured for wireless communication, the apparatus comprising:

means for transmitting a first message for configuring a user equipment, UE, to perform at least one repetition of an uplink transmission to be transmitted to a network entity and means for configuring the UE to perform a deferral procedure and a first slot index-dependent procedure in a sequential order, wherein the UE is to perform the deferral procedure on the at least one repetition of the uplink transmission and perform the first slot index-dependent procedure that is based, at least in part, on a resource position at which the at least one repetition of the uplink transmission is to be transmitted from the UE to the network entity, wherein the sequential order for performing the deferral procedure and the first slot index-dependent procedure is based on a type of the first slot index-dependent procedure, wherein the type identifies whether the first slot index-dependent procedure is associated with a feedback reporting-related procedure, an uplink transmission prioritization procedure, or an out-of-order condition checking procedure; and means for receiving at least one transmission from the UE according to the deferral procedure and the first slot index-dependent procedure in the sequential order when the first slot index-dependent procedure is determined to be performed.

* * * * *